(12) United States Patent
Iwase et al.

(10) Patent No.: US 8,988,347 B2
(45) Date of Patent: Mar. 24, 2015

(54) IMAGE PROCESSING APPARATUS, IMAGE DISPLAYING METHOD, AND IMAGE DISPLAYING PROGRAM

(75) Inventors: Ayako Iwase, Kanagawa (JP); Qihong Wang, Tokyo (JP); Akiko Terayama, Tokyo (JP); Hiroyuki Ozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1195 days.

(21) Appl. No.: 12/607,508

(22) Filed: Oct. 28, 2009

(65) Prior Publication Data

US 2010/0134415 A1    Jun. 3, 2010

(30) Foreign Application Priority Data

Nov. 28, 2008 (JP) .................................. 2008-303681

(51) Int. Cl.
*G06F 3/033* (2013.01)
*G06F 17/30* (2006.01)
*G06F 1/16* (2006.01)
(Continued)

(52) U.S. Cl.
CPC ........ *G06F 17/30265* (2013.01); *G06F 1/1626* (2013.01); *G06F 3/04845* (2013.01); *G06F 3/04883* (2013.01); *G06F 17/30277* (2013.01); *H04N 1/00411* (2013.01); *H04N 1/00453* (2013.01); *H04N 1/00461* (2013.01); *H04N 1/2166* (2013.01); *H04N 5/23216* (2013.01); *G06F 2200/1636* (2013.01); *G06F 2200/1637* (2013.01); *H04N 2101/00* (2013.01)
USPC .......................................................... 345/158

(58) Field of Classification Search
CPC ............. G09G 5/00; G09G 5/08; G09G 1/00; G06F 3/033; G06F 17/30; G06F 17/00; G06F 3/00; G06F 3/041; G06K 9/34
USPC .................................... 345/158, 173; 715/835
See application file for complete search history.

(56) References Cited

FOREIGN PATENT DOCUMENTS

JP       5-189484        7/1993
JP       9-6791          1/1997
(Continued)

OTHER PUBLICATIONS

Office Action issued Apr. 7, 2011 in Japanese Patent Application No. 2008-303681 (with English translation).
(Continued)

*Primary Examiner* — Tony N Ngo
(74) *Attorney, Agent, or Firm* — Oblon, Spivak, McClelland, Maier & Neustadt, L.L.P.

(57) ABSTRACT

An image processing apparatus includes an instructed-position detecting unit configured to receive an instruction operation by a user on a display screen of a display device and detect and output a position where the instruction operation is performed; a storing unit configured to store multiple image data items each including information corresponding to a search key; a search-key display controlling unit configured to cause at least one search key to be selectively displayed on the display screen of the display device; a searching unit configured to, if the search key displayed on the display screen is instructed by the search-key display controlling unit through the instructed-position detecting unit, search the storing unit for the image data corresponding to the search key to extract the image data; and a display controlling unit configured to collectively display images corresponding to the image data in a certain part on the display screen.

20 Claims, 23 Drawing Sheets

(51) Int. Cl.

| | | |
|---|---|---|
| G06F 3/0484 | (2013.01) | |
| G06F 3/0488 | (2013.01) | |
| H04N 1/00 | (2006.01) | |
| H04N 1/21 | (2006.01) | |
| H04N 5/232 | (2006.01) | |
| H04N 101/00 | (2006.01) | |

(56) References Cited

FOREIGN PATENT DOCUMENTS

| | | |
|---|---|---|
| JP | 10-289251 | 10/1998 |
| JP | 2000-222416 | 8/2000 |
| JP | 2001-126458 | 5/2001 |
| JP | 2001-195415 | 7/2001 |
| JP | 2003-52019 | 2/2003 |
| JP | 2003-196316 | 7/2003 |
| JP | 2005-354134 | 12/2005 |
| JP | 2008-97175 | 4/2008 |
| JP | 2008-165424 | 7/2008 |
| WO | WO 02/057959 A2 | 7/2002 |
| WO | WO 02/057959 A3 | 7/2002 |
| WO | WO 2005/088475 A1 | 9/2005 |
| WO | WO 2006/077512 A1 | 7/2006 |
| WO | WO 2007/066662 A1 | 6/2007 |
| WO | WO 2007/066663 A1 | 6/2007 |

OTHER PUBLICATIONS

Masaya Miyanami, et al., "Proposal for Interface of Information-Seeking to Associate Mobile Experience", Human Interface Symposium Memoirs, Sep. 3, 2007, vol. 2007, pp. 815-818.

U.S. Appl. No. 12/776,856, filed May 10, 2010, Iwase, et al.
U.S. Appl. No. 12/479,269, filed Jun. 5, 2009, Ozawa, et al.
U.S. Appl. No. 12/496,984, filed Jul. 2, 2009, Iwase, et al.
U.S. Appl. No. 12/499,349, filed Jul. 8, 2009, Ozawa, et al.
U.S. Appl. No. 12/508,909, filed Jul. 24, 2009, Ozawa, et al.
U.S. Appl. No. 12/509,045, filed Jul. 24, 2009, Iwase, et al.
U.S. Appl. No. 12/511,717, filed Jul. 29, 2009, Iwase, et al.
U.S. Appl. No. 12/559,163, filed Jul. 14, 2009, Ozawa, et al.
U.S. Appl. No. 12/580,627, filed Oct. 16, 2009, Ozawa, et al.
U.S. Appl. No. 12/582,046, filed Oct. 20, 2009, Iwase, et al.
U.S. Appl. No. 12/604,795, filed Oct. 23, 2009, Iwase, et al.
U.S. Appl. No. 12/607,475, filed Oct. 28, 2009, Ozawa, et al.
Torsten Kieslich, "IPhoto 6", <URL: http://www.digitalkamera.de/software/iphoto_6/3253.aspx>, XP-002569521, Apr. 6, 2006, 1 page.
Susumu Harada, et al., "Lost in Memories: Interacting With Photo Collections on PDAs", Digital Libraries, XP 010725728, Jun. 7, 2004, pp. 325-333.
Prince McLean, "Unofficial Mac tablet draws record crowd at Macworld (high-res photos)", <URL: http://www.appleinsider.com/articles/07/01/11/unofficial_mac_tablet_draws_record_crowd_at_macworld_high_res_photos.html>, XP002569523, Jan. 11, 2007, 7 pages.
Anonymous, "Create a Smart Album", <URL: http://web.archive.org/web/20071024115152/http://www.apple.com/support/ilife/tutorials/iphoto/ip3-3.html>, XP002569522, Oct. 24, 2007. 1 page.
Anonymous, "Navigate Leopard Spaces", <URL: http://mactips.info/2007/11/navigate-leopard-spaces>, XP002569524, Nov. 21, 2007, 7 pages.
Adam Knight, "Basic Mac OS X Security", <URL: http://www.macgeekery.com/tips/security/basic_mac_os_x_security>, XP002571046, Feb. 16, 2006, 13 pages.
Kentaro Toyama, et al., "Geographical Location Tags on Digital Images", Proceedings of the 11$^{th}$. ACM International Multimedia Conference, vol. Conf. 11, XP 002420408, Nov. 2, 2003, 11 pages.

FIG. 2

| FILE NAME | KEYWORD (ONE OR MORE) | GPS INFORMATION |
|---|---|---|
| IMAGE ANALYSIS INFORMATION | CAMERA INFORMATION | CAPTURING DATE AND TIME |
| IMAGE DATA | | |

FIG. 3

| FOLDER NAME | EVENT TITLE | CREATION DATE AND TIME | OTHERS |
|---|---|---|---|
| | | | |
| FILE NAME 1 | ADDRESS ON RECORDING MEDIUM | | CAPTURING DATE AND TIME |
| FILE NAME 2 | ADDRESS ON RECORDING MEDIUM | | CAPTURING DATE AND TIME |
| ⋮ | ⋮ | | ⋮ |

FIG. 4

| CATEGORY | SEARCH KEY CANDIDATES |
|---|---|
| PERSON | FAMILY, FATHER, MOTHER, ELDER BROTHER, ELDER SISTER, YOUNGER BROTHER, YOUNGER SISTER,... JANE (ORIGINAL), MR. A, MR. B, MS. C,... |
| PLACE | PLACE NAMES (STATE NAMES, CITY NAMES, STREET ADDRESS NAMES, AND OTHER PLACE NAMES), STATION NAMES, VARIOUS LANDMARK NAMES, ETC. |
| COLOR | RED, WHITE, BLACK, BLUE,... |
| SEASON | SPRING, SUMMER, AUTUMN, WINTER, NEW YEAR, EARLY SPRING, EARLY SUMMER, RAINY SEASON, EARLY AUTUMN, EARLY WINTER,... |
| OBJECT | ANIMAL, DOG, CAT, BIRD,... FLOWER, CHERRY BLOSSOM, SUNFLOWER,... TREE, GRASS, MOUNTAIN, SEA, RIVER,... |
| CAMERA INFORMATION | APERTURE, SHUTTER SPEED,... |
| OTHERS | IMAGE ANALYSIS, GPS INFORMATION... |

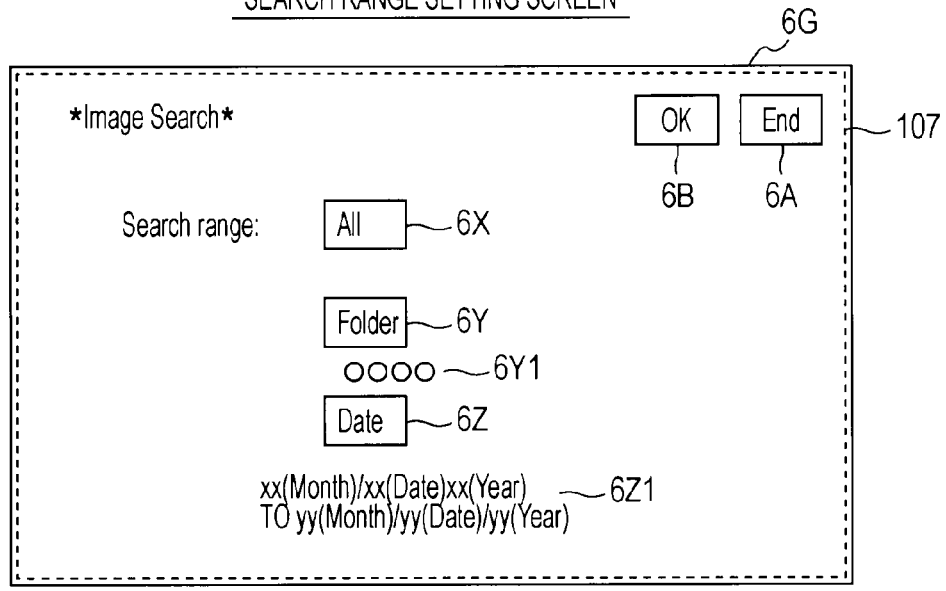
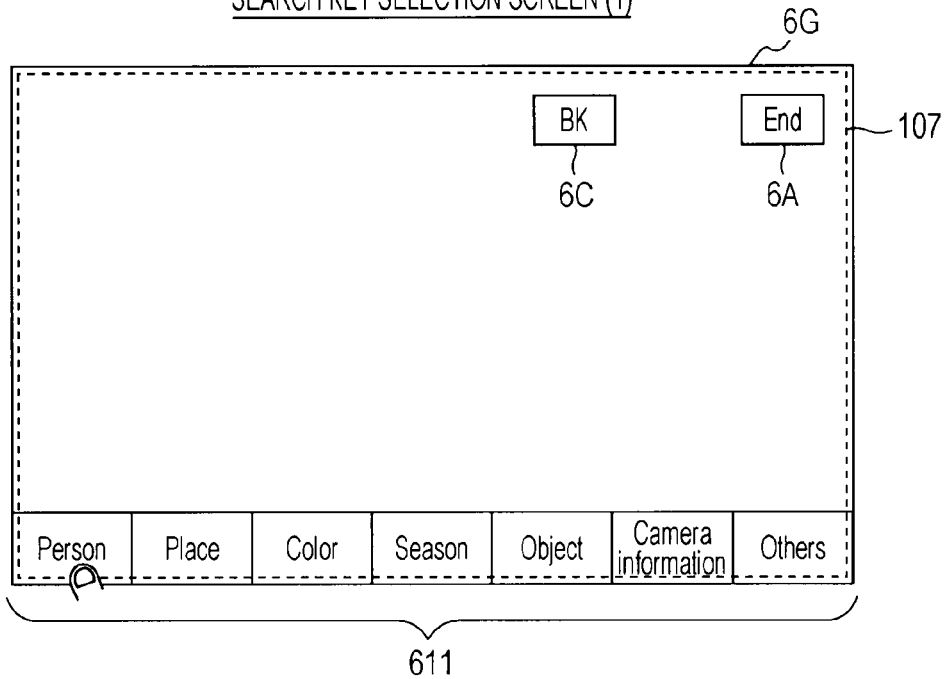

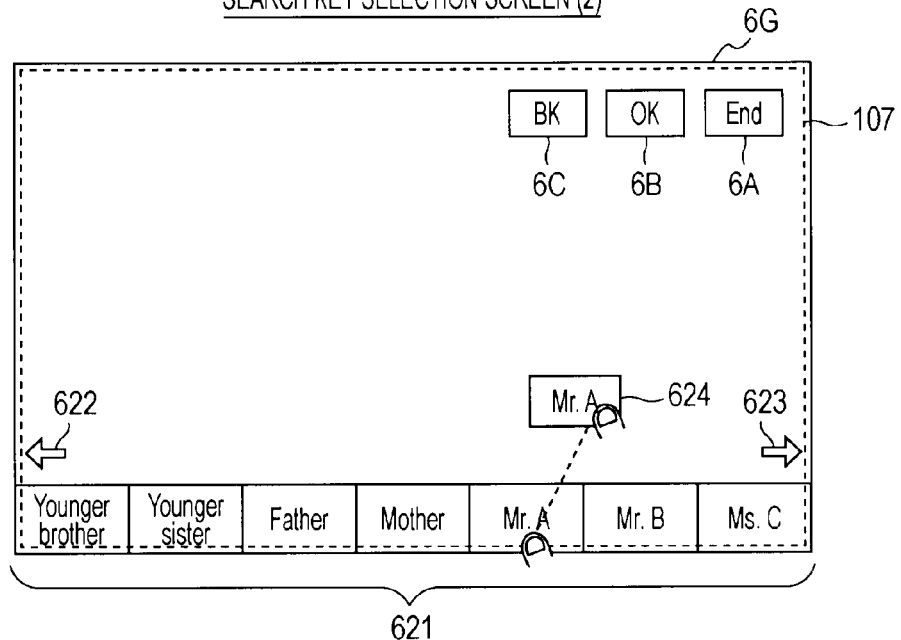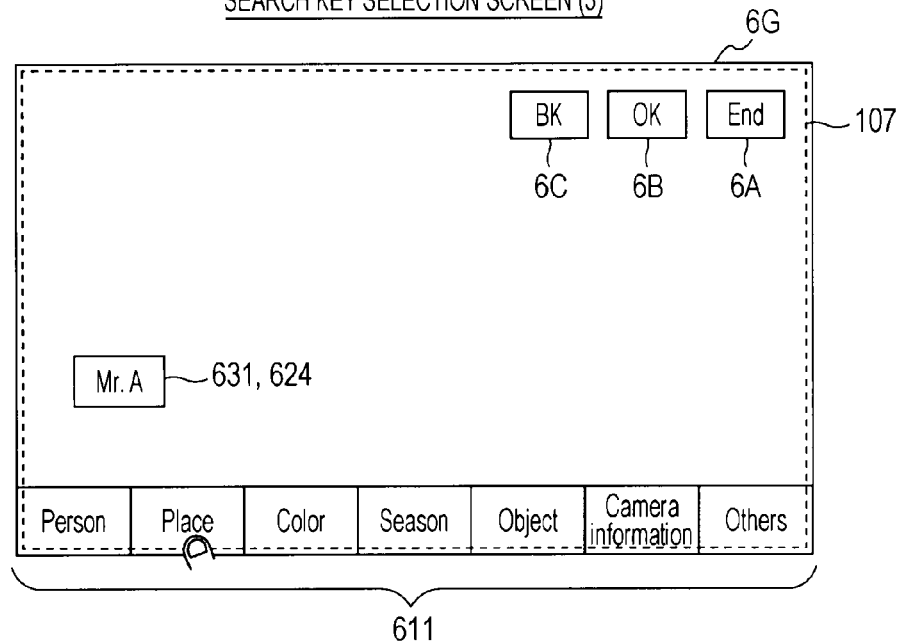

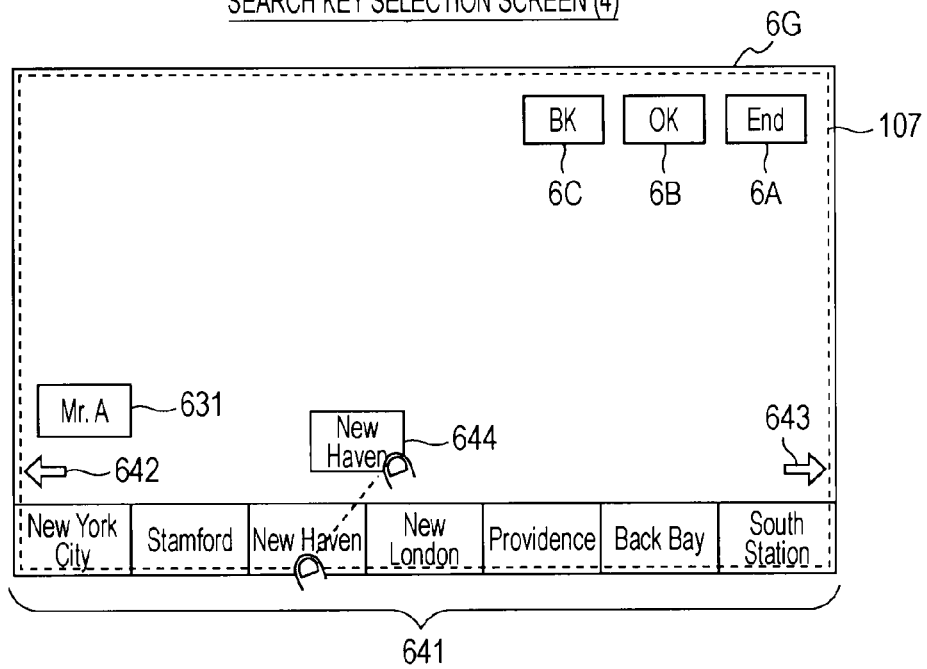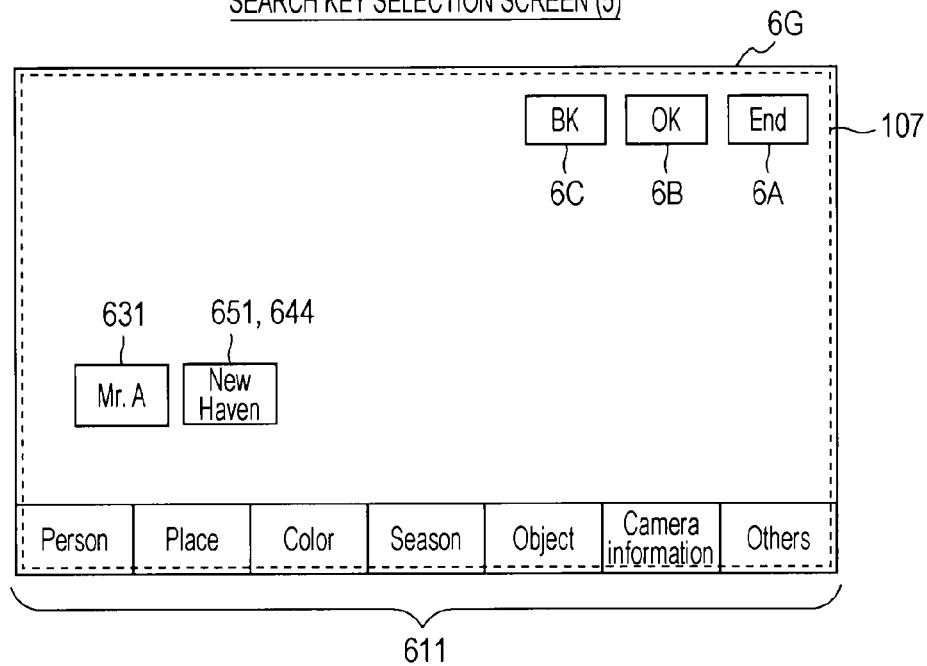

BEFORE SEARCH

DURING SEARCH

AFTER SEARCH
STATE AT TIME WHEN
ARBITRARY TIME T
HAS NOT ELAPSED
SINCE FINGER WAS
RELEASED

AFTER SEARCH
STATE AT TIME WHEN ARBITRARY TIME T HAS NOT
ELAPSED SINCE FINGER WAS RELEASED

SPECIFY GROUP BY DRAG OPERATION

AFTER SEARCH
STATE AT TIME WHEN ARBITRARY TIME T HAS NOT ELAPSED SINCE FINGER WAS RELEASED

RETURN TO INITIAL STATE AFTER ARBITRARY TIME T HAS ELAPSED

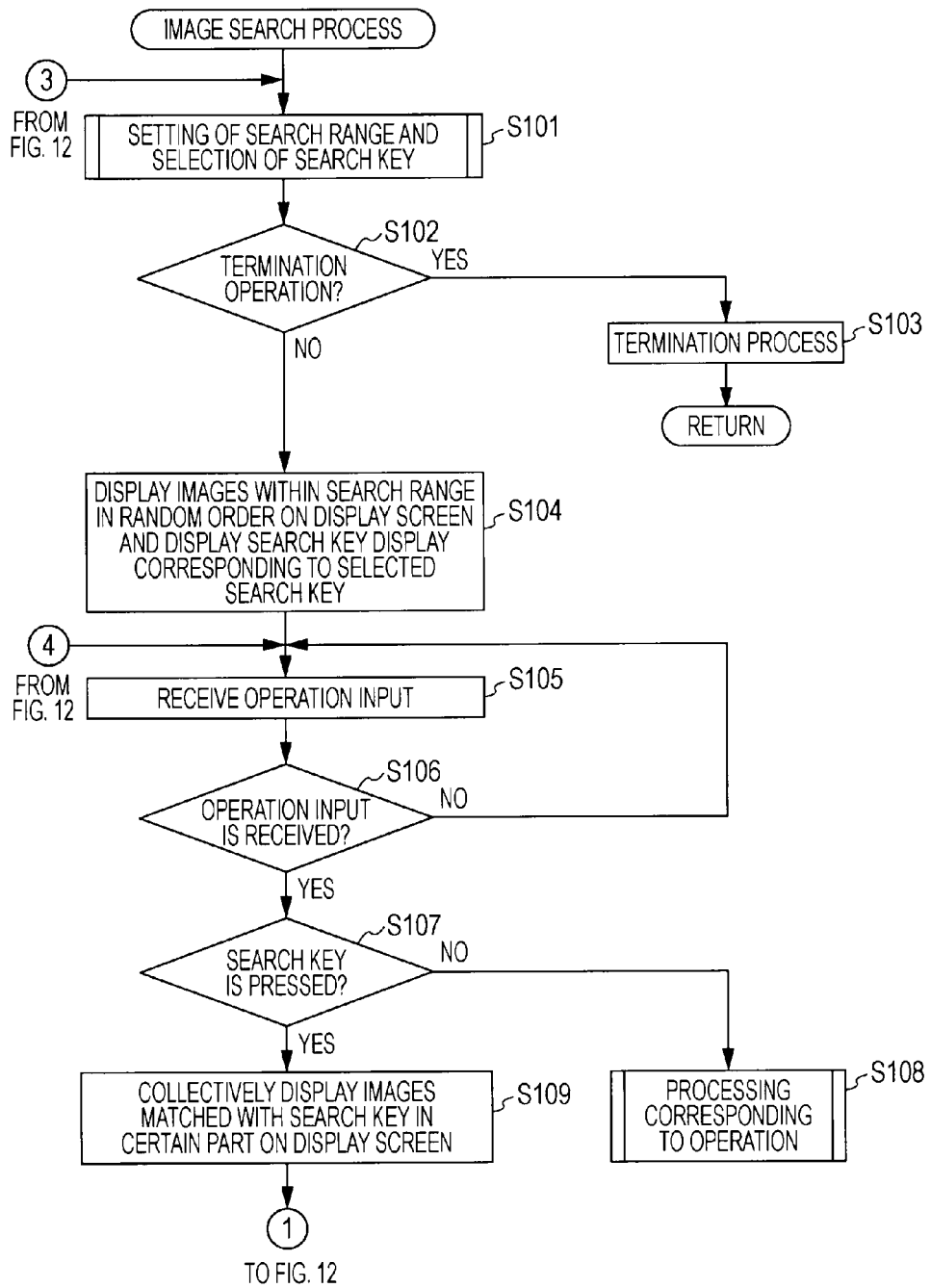

BEFORE SEARCH

AFTER SEARCH

BEFORE SEARCH

IMAGES THAT CAN BE
USED AS SEARCH KEYS

DURING SEARCH

BEFORE SEARCH kx
IMAGE TO BE USED
AS SEARCH KEY

IMAGE kx

BEFORE SEARCH

IMAGE kx

IMAGE ky

BEFORE SEARCH

DURING SEARCH
MOVING ICON USED AS SEARCH KEY CAUSES IMAGES
MATCHED WITH SEARCH KEY TO BE COLLECTED LIKE MAGNET

BEFORE SEARCH

DURING SEARCH
MOVING ICON USED AS SEARCH KEY CAUSES IMAGES THAT ARE NOT
MATCHED WITH SEARCH KEY TO BE FLICKED OUT FROM SCREEN

KEEPING CONTACT WITH SEARCH KEY REFINES IMAGES
TO IMAGES MATCHED WITH SEARCH KEY.
KEEPING CONTACT WITH SEARCH KEY FOR TIME PERIOD
EXCEEDING PREDETERMINED TIME PERIOD CAUSES IMAGES
RESULTING FROM SEARCH REFINEMENT TO BE DETERMINED AS GROUP

DURING SEARCH
STATE AT TIME WHEN ARBITRARY TIME T HAS NOT ELAPSED SINCE FINGER WAS RELEASED

DURING SEARCH
DOUBLE TAPPING SEARCH KEY WITHIN ARBITRARY TIME T SINCE FINGER HAS BEEN RELEASED CAUSES IMAGES RESULTING FROM REFINEMENT TO BE DETERMINED AS GROUP

DURING SEARCH
STATE AT TIME WHEN ARBITRARY TIME T HAS NOT ELAPSED SINCE FINGER WAS RELEASED

DURING SEARCH
STORING COLLECTED IMAGES IN FOLDER WITHIN ARBITRARY TIME T SINCE FINGER HAS BEEN RELEASED CAUSES IMAGES RESULTING FROM REFINEMENT TO BE DETERMINED AS GROUP

DURING SEARCH
STATE AT TIME WHEN ARBITRARY TIME T HAS NOT
ELAPSED SINCE FINGER WAS RELEASED

TILTING APPARATUS WITHIN ARBITRARY TIME T SINCE FINGER
HAS BEEN RELEASED CAUSES IMAGES RESULTING FROM
REFINEMENT TO FALL DOWN TO BE DETERMINED AS GROUP

DURING SEARCH
STATE AT TIME WHEN ARBITRARY TIME T HAS NOT
ELAPSED SINCE FINGER WAS RELEASED

DURING SEARCH
SHAKING APPARATUS FROM SIDE TO SIDE WITHIN ARBITRARY TIME T
SINCE FINGER HAS BEEN RELEASED CAUSES IMAGES RESULTING
FROM REFINEMENT TO FALL DOWN TO BE DETERMINED AS GROUP

DURING SEARCH
STATE AT TIME WHEN ARBITRARY TIME T HAS NOT
ELAPSED SINCE FINGER WAS RELEASED

DURING SEARCH
TAPPING TOP FACE OF APPARATUS WITHIN ARBITRARY TIME T
SINCE FINGER HAS BEEN RELEASED CAUSES IMAGES RESULTING
FROM REFINEMENT TO FALL DOWN TO BE DETERMINED AS GROUP

IMAGE PROCESSING APPARATUS, IMAGE DISPLAYING METHOD, AND IMAGE DISPLAYING PROGRAM

BACKGROUND OF THE INVENTION

1. Field of the Invention

The present invention relates to an apparatus, such as a digital still camera, that is provided with a display device including a relatively large display screen and that is capable of displaying various images, and to a method and program used in the apparatus.

2. Description of the Related Art

Digital still cameras that record captured images in recording media as digital data are in widespread use. In recent years, a reduction in size and an increase in capacity of built-in flash memories and removable memories used in the digital still cameras are promoted, so that a large amount of image data can be stored in these memories.

In the digital still cameras, the number of stored images that are captured is increased with the increasing number of years and image data items of a number that is unmanageable by users are often stored in the built-in flash memories and the removable memories.

In such situations, users add keywords to image data to allow search using the keywords in some digital still cameras. For example, a variety of information including places where image data is captured and the names of persons in the images is add to the captured image data as keywords.

In search for the image data item corresponding to a desired image from image data items by using the keywords added to the image data items, users set (instruct) search keys to perform the search.

For example, an appropriate search key is selected from search keys that are presented in advance to set the selected search key, or text data that is input by a user is received to set the received text data as a search key. Then, the search can be performed by using the set search key to narrow image data down to the image data having the set search key.

As described above, adding keywords to image data allows the search of the image data by using the keywords, thus achieving flexible search for the image data.

A variety of improvement is achieved in the image search using keywords. For example, technologies to allow rapid and precise search for desired images are disclosed in Japanese Unexamined Patent Application Publication No. 2005-354134 and Japanese Unexamined Patent Application Publication No. 2008-165424.

SUMMARY OF THE INVENTION

In the search for image data by using the keywords described above, if a desired image is not included in an image group resulting from search refinement of images by using a search key that is set, the search is repeatedly performed while the search key is varied until the image group including the desired image is acquired.

Specifically, processes (1) to (3) are repeated until the search refinement results in the image group including the desired image: (1) the refinement of images (search result) is cleared to return to the initial state, (2) the search key is set again, and (3) the search refinement (search) is performed on the basis of the new search key.

In general, the image group including a desired image is rarely acquired by one image search. Accordingly, in the image search by using the keywords, the processes (1) to (3) can possibly be repeated at higher frequencies. In such a case, burdens are placed on users.

Accordingly, it is desirable to realize the image search as easily as possible. It is also desirable that various search keys can be used in the image search, in addition to the keywords that are set by users, in order to realize more flexible image search.

In order to resolve the above problems, it is desirable to realize easy and user-friendly image search.

According to an embodiment of the present invention, an image processing apparatus includes instructed-position detecting means for receiving an instruction operation by a user on a display screen of a display device, detecting a position where the instruction operation is performed, and outputting the detected position; storing means for storing a plurality of image data items each including information corresponding to a search key; search-key display controlling means for causing at least one search key to be selectively displayed on the display screen of the display device; searching means for, if the search key displayed on the display screen of the display device is instructed by the search-key display controlling means through the instructed-position detecting means, searching the storing means for the image data corresponding to the instructed search key to extract the image data; and display controlling means for collectively displaying images corresponding to the image data extracted by the searching means in a certain part on the display screen.

In the image processing apparatus according to the above embodiment of the present invention, the search-key display controlling means causes at least one search key that can be selected to be displayed on the display screen of the display device. If the user performs an instruction operation to select (instruct) the search key on the operation panel of the instructed-position detecting means, the searching means searches the storing means for the image data corresponding to the instructed search key to extract the image data. The images corresponding to the extracted image data are collectively displayed in a certain part on the display screen by the display controlling means.

Accordingly, the user can set the search key with a simple operation to easily perform the image search in a user-friendly manner.

According to the present invention, it is possible to easily perform the image search in a user-friendly manner without complicated operations and search results that are difficult to understand.

BRIEF DESCRIPTION OF THE DRAWINGS

FIG. 2 illustrates an example of the layout of an image file recorded on a recording medium in the image pickup apparatus;

FIG. 3 illustrates an example of the layout of an image folder recorded on the recording medium in the image pickup apparatus;

FIG. 4 illustrates an example of a search key candidate information table created in advance in, for example, the recording medium or an EEPROM in the image pickup apparatus;

FIGS. 5A and 5B illustrate examples of how to select a search key used in image search from search key candidate information registered in the search key candidate information table;

FIGS. 6A and 6B illustrate examples of how to select a search key used in the image search from the search key candidate information registered in the search key candidate information table;

FIGS. 7A and 7B illustrate examples of how to select a search key used in the image search from the search key candidate information registered in the search key candidate information table;

FIG. 11 is a flowchart illustrating an image search process performed in the image pickup apparatus;

DESCRIPTION OF THE PREFERRED EMBODIMENTS

Apparatuses, methods, programs according to embodiments of the present invention will herein be described with reference to the attached drawings.

[Exemplary Configuration of Image Pickup Apparatus]

Figure 1:
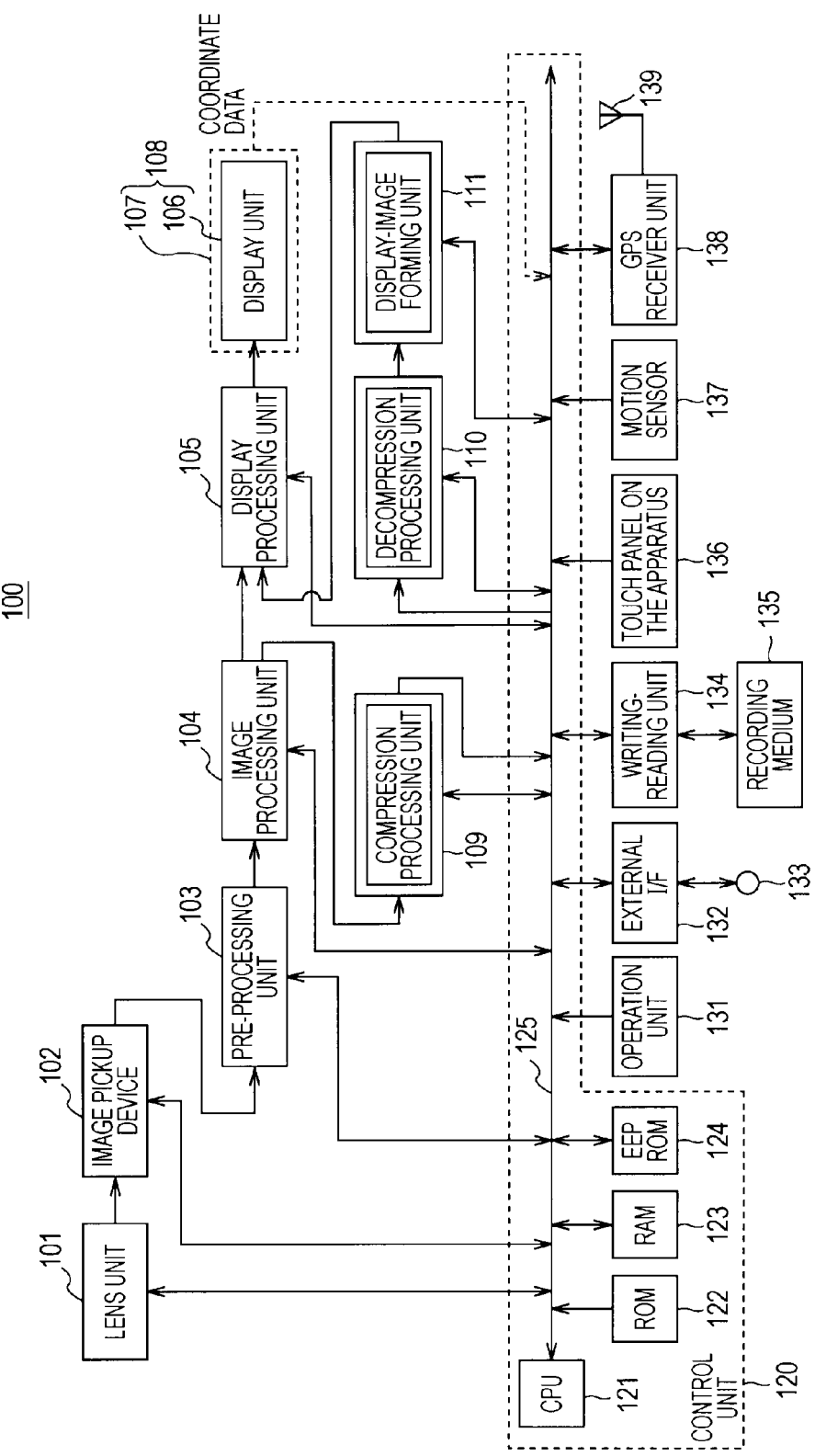
FIG. 1 is a block diagram illustrating an example of the configuration of an image pickup apparatus to which an apparatus, method, and program according to embodiments of the present invention are applied.

FIG. 1 is a block diagram illustrating an example of the configuration of an image pickup apparatus 100 to which an apparatus, method, and program according to embodiments of the present invention are applied. The image pickup apparatus 100 is capable of switching the capturing mode to capture both of still images and moving images and recording the captured still images and moving images on a recording medium.

However, it is assumed in the following embodiments for simplicity that the image pickup apparatus 100 functions as a digital still camera that mainly captures and reproduces still images. Examples of the configuration and operation of the image pickup apparatus 100 functioning as the digital still camera will now be described.

Referring to FIG. 1, the image pickup apparatus 100 includes a lens unit 101, an image pickup device 102, a pre-processing unit 103, an image processing unit 104, a display processing unit 105, a display unit 106, a touch panel 107, a compression processing unit 109, a decompression processing unit 110, and a display-image forming unit 111.

The image pickup apparatus 100 also includes a control unit 120, an operation unit 131, an external interface (hereinafter abbreviated to an external I/F) 132, an input-output terminal 133, a writing-reading unit 134, and a recording medium 135. The image pickup apparatus 100 further includes a touch panel 136 on the apparatus, a motion sensor 137, a global positioning system (GPS) receiver unit 138, and a GPS reception antenna 139.

The image pickup apparatus 100 of the present embodiment includes a clock circuit, although not illustrated in FIG. 1. The clock circuit has a calendar function to allow provision of the current year, month, and date, the current day of week, and the current time. The clock circuit can realize a time counter function to measure a certain time period, if necessary.

With the functions of the clock circuit, information about the capturing date, such as the capturing date and time and the capturing day of week, can be added to image data that is captured. In addition, the image pickup apparatus 100 can use the functions of the clock circuit to realize a self-timer function to allow automatic release of the shutter and shooting after a certain time has elapsed since a predetermined operation.

In the image pickup apparatus 100 of the present embodiment, the display unit 106 is a thin display device, such as a liquid crystal display (LCD) or an organic electroluminescence (EL) panel. The touch panel 107 is attached to the entire display screen of the display unit 106 to form an operation panel, as described below.

The touch panel 107 receives an instruction operation (touch operation) by a user on the operation panel to detect the instructed position (touched position) on the operation panel of the touch panel 107. Then, the touch panel 107 notifies the control unit 120 of coordinate data indicating the instructed position.

The control unit 120 controls each component in the image pickup apparatus 100, as described below, and recognizes what is displayed on the display screen of the display unit 106. The control unit 120 can receive an instruction operation (input operation) by the user on the basis of the coordinate data, which is supplied from the touch panel 107 and which indicates the instructed position on the operation panel, and display information that corresponds to the instructed position and that is on the display screen of the display unit 106.

For example, it is assumed that the user touches a position on the operation panel of the touch panel 107 with his/her finger or with a stylus. If a figure is displayed at the position on the display screen corresponding to (matched with) the touched position in this case, the control unit 120 determines that the user has selected and input the displayed figure.

As described above, in the image pickup apparatus 100, the display unit 106 and the touch panel 107 compose a touch screen 108 functioning as an input device. The touch panel 107 is realized as, for example, a pressure-sensitive touch panel or an electrostatic touch panel.

The touch panel 107 can detect operations that are simultaneously performed at multiple positions on the operation panel to output the coordinate data indicating the respective touched positions. The touch panel 107 can also detect instruction operations that are repeatedly performed on the operation panel to output the coordinate data indicating the respective touched positions.

Furthermore, the touch panel 107 can continually detect the touched positions at predetermined intervals while the user touches the operation panel with his/her finger or the stylus to output the coordinate data indicating the respective touched positions.

Accordingly, the touch panel 107 can receive various instruction operations (operation inputs), such as a tap operation, a double tap operation, a drag operation, a flick operation, and a pinch operation, by the user to detect the received instruction operations.

The tap operation is a user's action (operation) of "tapping" a position on the operation panel "once" with his/her finger or the stylus. The double tap operation is a user's action of "tapping" a position on the operation panel "two successive times" with his/her finger or the stylus.

The drag operation is a user's action of moving his/her finger or the stylus on the operation panel with being in contact with the operation panel. The flick operation is a user's action of instructing a position on the operation panel with his/her finger or the stylus and, then, rapidly "flicking" the finger or the stylus in an arbitrary direction.

The pinch operation is a user's action of simultaneously touching positions on the operation panel with his/her two fingers or the likes and opening or closing the two fingers or the likes. The operation of opening the two fingers or the likes in contact with the operation panel is called a pinch-out operation, and the operation of closing the two fingers or the likes in contact with the operation panel is called a pinch-in operation.

The drag operation and the flick operation are user's operations of touching the operation panel with his/her finger or the like and, then, moving his/her finger or the like on the operation panel (dragging operation on the operation panel) although the drag operation differs from the flick operation in the operation speed. The drag and flick operations can be determined from two kinds of information: the movement distance and the movement direction.

Accordingly, the drag operation and the flick operation are collectively called "a dragging operation" in this specification if performing either of the drag operation and the flick operation results in the same processing.

Referring back to FIG. 1, the control unit 120 is connected to each component in the image pickup apparatus 100 and controls each component in the image pickup apparatus 100, as described above. The control unit 120 configured as a microcomputer.

In the control unit 120, a central processing unit (CPU) 121, a read only memory (ROM) 122, a random access memory (RAM) 123, and an electrically erasable programmable read only memory (EEPROM) 124 are connected to each other via a CPU bus 125.

The control unit 120 reads out programs stored in the ROM 122 described below and executes the readout programs to generate a control signal that is supplied to each component. In addition, the control unit 120 receives data etc. supplied from each component to process the received data.

The ROM 122 stores the various programs executed by the CPU 121 and the variety of data necessary for the processing. The RAM 123 is mainly used as a working area to, for example, temporarily store the results during the processing.

The EEPROM 124 is a non-volatile memory and stores information that should be held if the image pickup apparatus 100 is turned off. For example, various parameters set by the user, the final results of the variety of processing, and/or processing programs and data that are newly supplied to the image pickup apparatus 100 for addition of functions are held in the EEPROM 124.

The operation unit 131, the external I/F 132, the writing-reading unit 134, the touch panel 136 on the apparatus, the motion sensor 137, and the GPS receiver unit 138 are connected to the control unit 120 having the above configuration via the CPU bus 125, as illustrated in FIG. 1.

The operation unit 131 includes operation keys including various adjustment keys, various function keys, and a shutter key. The operation unit 131 receives an operation input by the user and notifies the control unit 120 of the operation input. The control unit 120 controls each component in response to the operation input by the user received through the operation unit 131 to execute the processing corresponding to the operation input.

The external I/F 132 is a digital interface conforming to a certain standard, such as Universal Serial Bus (USB) or an Institute of Electrical and Electronics Engineers (IEEE) 1394.

Specifically, the external I/F 132 converts data supplied from an external device connected to the input-output terminal 133 into data having a format that can be processed in the image pickup apparatus 100 to receive the data resulting from the conversion and converts data to be transmitted from the image pickup apparatus 100 into data having a certain format to output the data resulting from the conversion.

The writing-reading unit 134 writes data in the recording medium 135 in the image pickup apparatus 100 and reads out data recorded in the recording medium 135 under the control of the control unit 120.

The recording medium 135 is removable from the image pickup apparatus 100. The recording medium 135 is, for example, a memory card removable memory that uses a semiconductor memory and that has a storage capacity of at least a few gigabytes.

Instead of the memory card removable memory, for example, a built-in recording medium, such as a built-in flash memory or a compact hard disk, may be used as the recording medium 135.

In addition, other removable recording media including an optical disk, such as a compact digital versatile disk (DVD) and a compact disc (CD), may be used as the recording medium 135.

The touch panel 136 on the apparatus receives an instruction input by the user in certain cases. The touch panel 136 on the apparatus is realized as a pressure-sensitive touch panel or an electrostatic touch panel. The touch panel 136 on the apparatus may not necessarily be a touch panel and may be realized as a so-called hardware key.

The motion sensor 137 detects a motion of the image pickup apparatus 100. Specifically, for example, the motion sensor 137 is a two-axis or three-axis acceleration sensor. If the image pickup apparatus 100 is tilted, the motion sensor 137 detects which direction and how much the image pickup apparatus 100 is tilted and notifies the control unit 120 of the direction and the tilt angle.

The motion sensor 137 can distinctively detect a case where the image pickup apparatus 100 is shook from side to side and a case where the image pickup apparatus 100 is shook up and down to notify the control unit 120 of the shook state of the image pickup apparatus 100. In addition, the motion sensor 137 can detect, for example, a vibration that is applied by tapping to notify the control unit 120 of the vibration.

The GPS receiver unit 138 receives certain signals from multiple artificial satellites through the GPS reception antenna 139 and analyzes the received signals to detect the current position of the image pickup apparatus 100. The GPS receiver unit 138 notifies the control unit 120 of the current position.

With the function of the GPS receiver unit 138, the image pickup apparatus 100 can acquire information about the current position during image capturing to add position information (GPS information) indicating the position of the image capturing to image data as metadata.

The GPS receiver unit 138 may be activated or deactivated, for example, in response to an instruction from the user received through the operation unit 131.

In the image pickup apparatus 100 illustrated in FIG. 1, the lens unit 101 includes an image pickup lens (objective lens), an exposure control mechanism, a focus control mechanism, a shutter mechanism, and so on, although they are not illustrated in FIG. 1. The lens unit 101 acquires an image of an object to form the image of the object on a sensor surface of the image pickup device 102 downstream of the lens unit 101.

The image pickup device 102 is an imaging sensor (image pickup element), such as a charge coupled device (CCD) or a complementary metal oxide semiconductor (CMOS) image sensor. The image pickup device 102 acquires an image formed on its sensor surface through the lens unit 101 as an electrical signal (image signal).

In the image pickup apparatus 100 of the present embodiment, the image pickup device 102 includes a single-plate color filter that has a predetermined color pattern and that forms a signal of red (R), green (G), or blue (B) for every pixel.

The image signal acquired by the image pickup device 102 is supplied to the pre-processing unit 103 downstream of the image pickup device 102. The pre-processing unit 103 includes a correlated double sampling (CDS) circuit, an automatic gain control (AGC) circuit, an analog-to-digital (A/D) converter, and so on. The pre-processing unit 103 acquires the image signal supplied from the image pickup device 102 as digital data.

The image signal (image data) acquired by the pre-processing unit 103 is supplied to the image processing unit 104. The image processing unit 104 includes a wave detector circuit, a white balance circuit, a demosaic circuit, a resolution conversion circuit, and other image correction circuits, although they are not illustrated in FIG. 1.

In the image processing unit 104, first, parameters for various control processes, including parameters for exposure control, parameters for focus control, and parameters for white balance control, are generated on the basis of the image data supplied from the pre-processing unit 103.

Of the parameters generated in the image processing unit 104, the parameters for the exposure control and the parameters for the focus control are supplied to the control unit 120. The control unit 120 controls the exposure control mechanism and the focus control mechanism in the lens unit 101 on the basis of the parameters supplied from the image processing unit 104 to appropriately perform the exposure control and the focus control.

Next, in the image processing unit 104, a black balance control process and a white balance control process based on the parameters for the white balance control generated in the above manner are performed on the image data supplied from the pre-processing unit 103. The image processing unit 104 performs these controls to adjust the image formed by the image data supplied from the pre-processing unit 103 to an appropriate color.

Then, in the image processing unit 104, a demosaic (synchronization) process for generating RGB data (three primary colors data) for every pixel, an aperture correction process, a gamma ($\gamma$) correction process, etc. are performed on the image data adjusted to the appropriate color.

Furthermore, in the image processing unit 104, a Y/C conversion process for generating a luminance signal (Y) and color signals (Cb, Cr) from the generated RGB data, a chromatic aberration correction process, a resolution conversion process, etc. are performed to generate the luminance signal Y and the color signals Cb and Cr.

The image data (the luminance signal Y and the color signals Cb and Cr) generated in the image processing unit 104 are supplied to the display processing unit 105 where the image data is converted into an image signal having a format to be supplied to the display unit 106. The image signal resulting from the conversion is supplied to the display unit 106.

As a result, an image of the object acquired through the lens unit 101 is displayed on the display screen of the display unit 106. The user can take an image of a desired object while confirming the image of the object displayed on the display screen of the display unit 106.

The luminance signal Y and the color signals Cb and Cr generated in the image processing unit 104 are supplied also to the compression processing unit 109. Upon pressing of the shutter key in the operation unit 131, the compression processing unit 109 compresses the image data of the image displayed on the display screen of the display unit 106 at this time and supplies the compressed image data to the control unit 120.

In the compression processing unit 109, the data compression is performed according to a predetermined data compression format. For example, Joint Photographic Experts Group (JPEG) format is used in the case of still images and Moving Picture Experts Group (MPEG) format is used in the case of moving images as the data compression format. The data compression format is not restricted to the JPEG and the MPEG and various data compression formats can be used in the compression processing unit 109.

The control unit 120 causes the writing-reading unit 134 to record the image data compressed in the compression processing unit 109 on the recording medium 135. In the image pickup apparatus 100, the image data forming a captured image of the object is recorded on the recording medium 135 in the above manner.

The image data captured in the above manner is stored on the recording medium 135 and is managed in folders created by the user in the image pickup apparatus 100. The management in folders will be described in detail below.

The folders are created for every purpose, for example, for every object or for every event. In the image pickup apparatus 100 of the present embodiment, the folders are created for every event in which the image capturing is performed. The events include an entrance ceremony, a sports festival, and a birthday party. The captured image may be later moved to a desired folder.

The image data recorded on the recording medium 135 can be read out by the writing-reading unit 134 controlled by the control unit 120. The image data read out from the recording medium 135 is supplied to the decompression processing unit 110 through the control unit 120.

The decompression processing unit 110 decompresses the supplied image data according to the data compression format used in the data compression to restore the image data before the data compression and supplies the image data resulting from the decompression to the display-image forming unit 111.

The display-image forming unit 111 uses the image data supplied from the decompression processing unit 110 and a variety of display data supplied from the control unit 120, if necessary, to generate the image data of the image to be displayed on the display screen of the display unit 106 and supplies the image data to the display processing unit 105.

The display processing unit 105 converts the image data supplied from the display-image forming unit 111 into an image signal of a format to be supplied to the display unit 106, as in the processing of the image data supplied from the image processing unit 104, and supplies the image data resulting from the conversion to the display unit 106.

The image corresponding to the image data recorded on the recording medium 135 can be displayed on the display screen of the display unit 106 in the above manner. In other words, the image data about a desired image recorded on the recording medium 135 can be reproduced.

As described above, the image pickup apparatus 100 of the present embodiment is capable of capturing an image of an object and recording the image on the recording medium 135. In addition, the image pickup apparatus 100 is capable of reading out image data recorded on the recording medium 135 to reproduce the readout image data and displaying the image corresponding to the image data on the display screen of the display unit 106.

In the image pickup apparatus 100 having the above configuration, information about candidates for search keys (search conditions), such as keywords, is added to image files of captured images recorded on the recording medium 135 to search for image data by using the search keys, as described below.

In addition, the search can be performed with operation steps of a number as small as possible in the image pickup apparatus 100 even if it is necessary to repeat the search for image data multiple times. Furthermore, with the image pickup apparatus 100, it is possible to present the search result to the user in a user-friendly manner and to determine the search result with a simple operation.

[Example of Configurations of Image File and Image Folder]

FIG. 2 illustrates an example of the layout of an image file recorded on the recording medium 135 in the image pickup apparatus 100. Referring to FIG. 2, the image file has a file name, which is identification information used for identifying each image file. The file name is automatically given by the control unit 120, for example, in the image capturing.

Metadata including one or more keywords, GPS information, image analysis information, camera information, and the capturing date and time is added to each image file. The metadata can be used as information corresponding to the search keys for image data.

The keyword is mainly text data input by the user. Specifically, one or more information items indicating the content of the image can be registered as the keywords. The information items include the name of a place where the image data is captured, the name of a person in the image, and the name of an event that is took place in the place.

When the image corresponding to the image data in the image file to which the keyword is added is displayed on the display screen of the display unit 106, the keyword can be input through the operation unit 131 or the touch screen 108 to be added to the image file.

Alternatively, for example, a variety of metadata including a keyword may be added to image data in a personal computer to acquire the metadata in the image pickup apparatus 100 through the input-output terminal 133 and the external I/F 132 and to record the metadata on the recording medium 135. In other words, the image data to which the metadata including a keyword is added in an external device may be acquired and used in the image pickup apparatus 100.

The GPS information is position information (information about a longitude and latitude) that is acquired through the GPS receiver unit 138 in the image capturing and that indicates the position where the image data is captured. The GPS information is added to the image file through the control unit 120.

The image analysis information indicates the result of image analysis of the image data in the image file by a certain method, which is stored in each image file. The image analysis is performed mainly by using the functions of the control unit 120 at appropriate timing after the image capturing and the information about the image analysis is added to the image file.

The image analysis information indicates characteristics of the image corresponding to each image data, which are digitalized by various methods including edge detection and color analysis. The image analysis information can be used to compare the similarity in composition or object between images.

Specifically, the image analysis information based on the result of the image analysis can be used to search for images including similar persons (faces), images including similar places, or images having similar color characteristics.

The camera information indicates, for example, the aperture and the shutter speed in the image capturing. The camera information is managed by the control unit 120 and is added to the image file by the control unit 120 in the image capturing. The camera information can be used to determine the camera conditions under which the image data is captured.

The capturing date and time is date and time information that is acquired by the control unit 120 through the clock circuit (not shown) in the image capturing and that is added to the image file. The capturing date and time indicates a year, month, day, and time. The capturing date and time can be used to accurately determine when the image data in each image file is captured.

The image file includes main data, which is image data that is generated in the image capturing and that forms an image of an object.

The image file created in the above manner is recorded on the recording medium 135 in the image pickup apparatus 100. Each image file is stored in an image folder that is created in the recording medium 135 in response to an instruction from the user, as described above.

In the image pickup apparatus 100 of the present embodiment, when the image folder is not created by the user, for example, a folder corresponding to the capturing date is automatically created and the image data resulting from the image capturing is stored in the created folder.

The image folders in which the image files are stored are created for every event such as an entrance ceremony, a sports festival, or a birthday party in which the image capturing is performed, for every capturing year and month, for every capturing year, month, and date, etc., as described above.

In addition to the above cases, for example, the image folders may be created for every object or may be created for every photographer if the image pickup apparatus 100 is shared in a family.

FIG. 3 illustrates an example of the layout of an image folder recorded on the recording medium 135 in the image pickup apparatus 100. Referring to FIG. 3, the image folder has a folder name, which is identification information used for identifying each image folder. Each folder name indicates information about an event, such as an entrance ceremony, a sports festival, or a birthday party, in which the image capturing is performed or information about the capturing date, such as the capturing year and month or the capturing year, month, and date.

Each image folder has a variety of metadata including the event title of the image folder, the date and time when the image folder is created, and others.

The event title indicates a more detailed content of an event when the image folder is created for the event. For example, "an entrance ceremony of Jane, Apr. 10, 2008" is stored as the event title.

The creation date and time indicate the date and time when the image folder is created and is acquired by the control unit 120 from the clock circuit (not shown) at the time when the image folder is created.

In addition to the above information, information that can be automatically added in the image pickup apparatus 100, for example, the number of the image files stored in the image folder, and comment information (text information) input by the user may be added as the metadata.

Each image folder includes the file name, the address on the recording medium, and the capturing date and time of each image file included in the image folder. The information in the image folder can be used to determine which image files are stored in the image folder, when the image files in the image folder are captured, and where each image file is stored on the recording medium.

The image files of the image data that is captured are managed in time series on the basis of the date and time when the image data is captured in each image folder. Accordingly, the image data in the image file illustrated in FIG. 3 can be sequentially read out and displayed in ascending or descending order of time on the basis of the information in the image folder.

[Search Key Candidate Information Table]

Information about candidates for the search keys (search key candidate information) is registered in advance in the image pickup apparatus 100 of the present embodiment in order to facilitate the search for the image data by using the search key. The search key candidate information registered in a search key candidate information table can be used as the search keys without the registration in the search, as described below.

FIG. 4 illustrates an example of the search key candidate information table created in advance in, for example, the recording medium 135 or the EEPROM 124 in the image pickup apparatus 100. In the image pickup apparatus 100 of the present embodiment, the search key candidate information is managed in seven categories: "person", "place", "color", "season", "object", "camera information", and "others" in the search key candidate information table, as illustrated in FIG. 4.

The category "person" includes the search key candidate information concerning persons. As illustrated in FIG. 4, for example, information indicating family, father, mother, elder brother, elder sister, younger brother, younger sister, etc. is registered in advance in the category "person". In addition, for example, the name of the user and the names of friends and acquaintances who are to be (were) objects, such as "Jane (the user)", "Mr. A", "Mr. B", and "Ms. C", may be registered in the category "person" by the user.

The category "place" includes the search key candidate information concerning places. As illustrated in FIG. 4, for example, information indicating state names, city names, street address names, other place names, station names, various landmark name, etc. is registered in advance in the category "place". Place names that have not been registered, such as new place names and new landmark names (high-rise building names and commercial facility names), may be registered in the category "place" by the user.

The category "color" includes color names, such as red, white, black, blue, etc., as illustrated in FIG. 4. Multiple common color names are registered in advance in the category "color". Color names that have not been registered may be registered in the category "color" by the user.

The category "season" includes the search key candidate information concerning seasons. As illustrated in FIG. 4, in addition to "spring, summer, autumn, and winter", several words concerning seasons, such as new year, early spring, early summer, rainy season, early autumn, and early winter, are registered in advance in the category "season". Words concerning seasons, which have not been registered, may be registered in the category "season" by the user.

The category "object" includes the search key candidate information concerning objects that can be photographic subjects. As illustrated in FIG. 4, the names of common photographic subjects, such as animal, flower, tree, sea, etc. are registered in advance in the category "object". Words concerning photographic subjects, which have not been registered, may be registered in the category "object" by the user.

The category "camera information" includes the search key candidate information indicating camera setup conditions in the image capturing, such as the aperture and the shutter speed. For example, the category "camera information" is used in the search for images that have been captured under special camera setup conditions. The camera information that has not been registered may be registered in the category "camera information" by the user.

The category "others" includes the search key candidate information that does not belong to any of the above six categories. For example, items names including image analysis and GPS information are registered in the category "others". The selection of any of the item names allows the image analysis information or the GPS information about a specific image to be used as the search key.

In the image pickup apparatus 100 of the present embodiment, the user can add various keywords to the image files recorded in the recording medium 135 in the image capturing, as described above.

Specifically, when the image corresponding to the image data stored in each image file that is recorded in the recording medium 135 in the image capturing is reproduced, the user can perform a certain operation for adding a keyword to input the keyword with the operation unit 131, also as described above.

In this case, the user selects a desired keyword from a displayed list of the search key candidate information in the search key candidate information table illustrated in FIG. 4 to add the selected keyword to the image file.

If a desired keyword is not included in the list of the search key candidate information, for example, the user may input text data such as a word with the input keys realized by the touch screen 108 to add the input text data as the keyword.

Alternatively, a variety of metadata including a keyword may be added to image data in a personal computer to acquire the metadata in the image pickup apparatus 100 through the input-output terminal 133 and the external I/F 132 and to record the metadata on the recording medium 135, as described above. In other words, the image data to which the metadata including a keyword is added in an external device may be acquired and used in the image pickup apparatus 100.

In addition, candidates for the search keys may be added to the search key candidate information table in the image pickup apparatus 100 through an external device, such as a personal computer, connected to the image pickup apparatus 100 via the input-output terminal 133 and the external I/F 132.

Furthermore, the search key candidate information table that is created in an external device, such as a personal computer, that is acquired in the image pickup apparatus 100 through the input-output terminal 133 and the external I/F 132, and that is stored in a certain memory, such as the EEPROM 124, may be used in the image pickup apparatus 100.

In this case, if the information input as the keyword is not included in the search key candidate information table, the control unit 120 prompts the user to confirm whether the keyword is added to the search key candidate information table.

If an instruction to add the keyword is issued, the control unit 120 registers the keyword in the category specified by the user, for example, with the operation unit 131.

In the image pickup apparatus 100 of the present embodiment, any of the keywords added to the image files stored in the recording medium 135 is made matched with any of the search key candidate information registered in the search key candidate information table.

[Selection of Search Key Used in Image Search]

A process of selecting the search key used in the image search from the search key candidate information registered in the search key candidate information table illustrated in FIG. 4 in the image pickup apparatus 100 of the present embodiment will now be described. FIGS. 5A to 7B illustrate examples of how to select the search key used in the image search from the search key candidate information registered in the search key candidate information table.

In the image pickup apparatus 100, when the user performs a certain operation, for example, when the user presses a menu key provided in the operation unit 131, the control unit 120 creates a menu including selection items indicating processes that can be executed in the image pickup apparatus 100 and displays the menu in the display unit 106.

Specifically, the control unit 120 generates image data for menu display (creates a menu window) by using the display information stored in the ROM 122 or the like. The control unit 120 processes the generated image data for menu display through the decompression processing unit 110, the display-image forming unit 111, and the display processing unit 105 to generate an image signal for menu display and supplies the image signal for menu display to the display unit 106.

As a result, the menu window including the selection items indicating the processes that can be executed in the image pickup apparatus 100 is displayed on a display screen 6G of the display unit 106, as illustrated in FIG. 5A. Since it is not necessary to decompress the image data for menu display, no processing is performed in the decompression processing unit 110.

As described above with reference to FIG. 1, the display unit 106 and the touch panel 107 form the touch screen 108 and an instruction input by the user is received through the touch screen 108 in the image pickup apparatus 100.

The user selects a menu item "Image Search" from the menu window displayed on the display screen 6G of the display unit 106 in the image pickup apparatus 100. Specifically, the user touches the position on the operation panel of the touch panel 107, which corresponds to the position where the menu item "Image Search" is displayed, with his/her finger or the like.

In response to the user's operation, the coordinate data indicating the position on the operation panel touched by the user is supplied from the touch panel 107 to the control unit 120. The control unit 120 determines which item is selected by the user on the basis of the coordinate data supplied from the touch panel 107 and the display information displayed at the position on the display screen, which corresponds to the position on the operation panel indicated by the coordinate data.

In this case, the control unit 120 recognizes that the menu item "Image Search" is displayed at the position on the display screen 6G corresponding to the position on the operation panel touched by the user. Accordingly, the control unit 120 determines that the menu item "Image Search" is selected by the user.

Then, the control unit 120 displays a search range setting screen illustrated in FIG. 5A on the display screen 6G of the display unit 106, as in the above case in which the menu window is displayed. As illustrated in FIG. 5A, the search range setting screen includes a title "*Image Search*" (the title of the screen). The search range setting screen also includes an All icon 6X, a Folder icon 6Y, and a Date icon 6Z used for specifying the search range. The search range setting screen further includes an End icon 6A and an OK icon 6B at its upper right corner, as illustrated in FIG. 5A.

Referring to FIG. 5A, the All icon 6X is used to specify all the image files recorded on the recording medium 135 as the search targets. Accordingly, if the All icon 6X is selected, the control unit 120 searches all the image files recorded on the recording medium 135 in the image search.

The Folder icon 6Y is used to specify only the image files stored in the image folder selected by the user, among the image files recorded on the recording medium 135, as the search targets.

If the Folder icon 6Y is selected, the control unit 120 creates a list of the image folders created on the recording medium 135 and displays the list on the display screen of the display unit 106 to allow the user to select a desired image folder.

When an image folder is selected by the user, the control unit 120 displays the folder name of the selected image folder on the display screen 6G of the display unit 106, as shown by a display 6Y1 in FIG. 5A.

The control unit 120 searches only the image files stored in the selected image folder. The number of the image folders that can be selected is not restricted to one and multiple image folders may be selected.

The Date icon 6Z is used to specify only the image files whose capturing years, months, and dates are within a date range specified by the user, among the image files recorded on the recording medium 135, as the search targets.

If the Date icon 6Z is selected, the control unit 120 displays a date range setting screen on the display screen of the display unit 106 to allow the user to input a desired date range.

When a date range is input by the user, the control unit 120 displays the input date range on the display screen 6G of the display unit 106, as shown by a display 6Z1 in FIG. 5A. The control unit 120 searches only the image files whose capturing years, months, and dates are within the input date range.

The date range may include only one day, such as Oct. 1, 2008 to Oct. 1, 2008, or may include multiple days, weeks, months, or years.

If the End icon 6A is selected on the search range setting screen in FIG. 5A, the control unit 120 terminates the image search process and, for example, returns to the state in which the menu window is displayed.

If the OK icon 6B is selected on the search range setting screen in FIG. 5A, the control unit 120 performs the image search in the selected range. In this case, the control unit 120 creates a search key selection screen (1) including a category list display 611, as illustrated in FIG. 5B, and displays the search key selection screen (1) on the display screen 6G of the display unit 106.

If the OK icon 6B is selected despite the fact that no search range is selected, the control unit 120 produces a warning sound or displays a warning message to prompt the user to select the search range.

As illustrated in FIG. 5B, the search key selection screen (1) includes the End icon 6A and a BK icon 6C. The search key selection screen (1) also includes the category list display 611 at the bottom of the display screen 6G.

The category list display 611 is created on the basis of the category information in the search key candidate information table described above with reference to FIG. 4 and includes the seven category names: person, place, color, season, object, camera information, and others, as illustrated in FIG. 5B.

The user selects a category name to which the search key candidate information to be used as the search key is estimated to belong from the category list display 611. Specifically, the user touches the position on the operation panel of the touch panel 107 corresponding to the position where a desired category name is displayed with his/her finger or the like to select the category name.

The control unit 120 determines which instruction is input by the user on the basis of the coordinate data supplied from the touch panel 107 and the display information displayed at the position on the display screen 6G corresponding to the position on the operation panel of the touch panel 107 indicated by the coordinate data.

It is assumed here that the user touches the position on the operation panel of the touch panel 107 corresponding to the position where the category "person" is displayed with his/her finger or the like, as illustrated in FIG. 5B. In this case, the control unit 120 determines that the category "person" is selected and creates a search key selection screen (2) including a displayed list of the search key candidate information belonging to the category "person" (search key candidate display) 621 and displays the search key selection screen (2) on the display screen 6G of the display unit 106, as illustrated in FIG. 6A.

If the End icon 6A is selected in the search key selection screen (1) in FIG. 5B, the control unit 120 terminates the image search process and, for example, returns to the state in which the menu window is displayed. If the BK icon 6C is selected in the search key selection screen (1) in FIG. 5B, the control unit 120 returns to the search range setting screen described above with reference to FIG. 5A to allow the user to set the search range again.

As illustrated in FIG. 6A, the search key selection screen (2) includes the End icon 6A, the OK icon 6B, and the BK icon 6C. The search key selection screen (2) also includes the search key candidate display 621 at the bottom of the display screen 6G.

The search key candidate display 621 is a list of the search key candidate information belonging to the category "person" selected in the search key selection screen (1). As illustrated in FIG. 6A, the search key selection screen (2) includes a left arrow icon 622 and a right arrow icon 623 used for scrolling the search key candidate display 621.

When the left arrow icon 622 is tapped, the control unit 120 scrolls the search key candidate display 621 from right to left by one search key candidate. Repeating the tapping of the left arrow icon 622 allows the search key candidate display 621 to be sequentially scrolled from right to left by one search key candidate.

Similarly, when the right arrow icon 623 is tapped, the control unit 120 scrolls the search key candidate display 621 from left to right by one search key candidate. Repeating the tapping of the right arrow icon 623 allows the search key candidate display 621 to be sequentially scrolled from left to right by one search key candidate.

When desired search key candidate information is displayed by scrolling the search key candidate display 621 with the left arrow icon 622 or the right arrow icon 623, the search key candidate information is selected.

Instead of using the left and right arrow icons 622 and 623, the search key candidate display 621 may be scrolled by, for example, performing a leftward dragging operation or a rightward dragging operation on the operation panel of the touch panel 107.

For example, if the item "Mr. A" in the search key candidate display 621 is the search key candidate information which the user wants to specify as the search key in the screen in FIG. 6A, the user touches the position on the operation panel of the touch panel 107 corresponding to the position where the item "Mr. A" is displayed with his/her finger or the like to perform the dragging operation (the drag operation or the flick operation).

The control unit 120 determines that the dragging operation is performed from the position where the item "Mr. A" is displayed on the basis of the coordinate data supplied from the touch panel 107 and the position where each display information item is displayed on the display screen 6G, as described above.

In this case, the control unit 120 recognizes that the item "Mr. A" has been selected as the search key and displays a display 624 of "Mr. A" selected as the search key outside the search key candidate display 621 on the display screen 6G. With the display 624, the user can recognize that the item "Mr. A" has been selected as the search key in the image pickup apparatus 100.

Similarly, another item belonging to the category "person" may be selected as the search key. In other words, multiple items (search key candidate information items) in the same category may be selected as the search keys.

If the user wants to terminate the image search after the item "Mr. A" has been selected as the search key, the user selects the End icon 6A. In response to the selection of the End icon 6A by the user, the control unit 120 terminates the image search process and, for example, returns to the state in which the menu window is displayed. In this case, it is determined that the selected search key has not been selected.

If the user wants to select another category after the item "Mr. A" has been selected as the search key, the user selects the BK icon 6C. In response to the selection of the BK icon 6C by the user, the control unit 120 returns to the search key selection screen (1) described above with reference to FIG.

5B to allow the user to select the category again. In this case, it is determined that the item "Mr. A" has not been selected as the search key.

If the OK icon 62 is selected after the item "Mr. A" has been selected as the search key, the control unit 120 identifies the item "Mr. A" selected in the screen in FIG. 6A as the search key.

Then, the control unit 120 creates a search key selection screen (3) which includes a display 631 of the item "Mr. A" identified as the search key and in which the category list display 611 is displayed again and displays the search key selection screen (3) on the display screen 6G of the display unit 106, as illustrated in FIG. 6B. The user can select a category from the search key candidate information table on the search key selection screen (3).

If the user wants to terminate the image search in the state in FIG. 6B, the user selects the End icon 6A. In response to the selection of the End icon 6A by the user, the control unit 120 terminates the image search and, for example, returns to the state in which the menu window is displayed.

If the user wants to select the search key again in the category "person", the user selects the BK icon 6C. In response to the selection of the BK icon 6C by the user, the control unit 120 returns to the search key selection screen (2) described above with reference to FIG. 6A to allow the user to select the search key in the category "person" again.

In this case, under the control of the control unit 120, the search key that has been selected may be cleared, the search key that has been selected may be cleared to select a new search key, or a search key may be additionally selected in addition to the search key that has been selected.

If the selection of the search key is finished in the state illustrated in FIG. 6B to perform the image search by using the selected search key, the user selects the OK icon 6B. In response to the selection of the OK icon 6B by the user, the control unit 120 clears the category list display 611 in the screen in FIG. 6B to allow the user to perform the image search.

In this case, the control unit 120 reads out the data about the images within the range set in the screen in FIG. 5A (the images within the search range) and controls the decompression processing unit 110, the display-image forming unit 111, and the display processing unit 105 in order to display the thumbnail images of the images within the search range on the entire display screen 6G in a random order. The control unit 120 waits for an instruction operation (touch operation) to instruct start of the image search on the display (the display 631 in the screen in FIG. 6B) of the selected search key.

If the search key is to be additionally selected in the state illustrated in FIG. 6B, the user selects a category name to which the search key candidate information to be used as the search key is estimated to belong, as in the case described above with reference to FIG. 5B. Specifically, the user touches the position on the operation panel of the touch panel 107 corresponding to the position where a desired category name is displayed with his/her finger or the like to select the category name.

It is assumed here that the user touches the position on the operation panel of the touch panel 107 corresponding to the position where the category "place" is displayed with his/her finger or the like, as illustrated in FIG. 6B. The control unit 120 determines that the category "place" is selected and creates a search key selection screen (4) including a displayed list of the search key candidate information belonging to the category "place" (search key candidate display) 641 and displays the search key selection screen (4) on the display screen 6G of the display unit 106, as illustrated in FIG. 7A.

As illustrated in FIG. 7A, the search key selection screen (4) includes the End icon 6A, the OK icon 6B, and the BK icon 6C. The search key selection screen (4) also includes the search key candidate display 641 at the bottom of the display screen 6G.

The search key candidate display 641 is a list of the search key candidate information belonging to the category "place" selected in the search key selection screen (3). As illustrated in FIG. 7A, the search key selection screen (4) includes a left arrow icon 642 and a right arrow icon 643 used for scrolling the search key candidate display 641.

When the left arrow icon 642 is tapped, the control unit 120 scrolls the search key candidate display 641 from right to left by one search key candidate. Repeating the tapping of the left arrow icon 642 allows the search key candidate display 641 to be sequentially scrolled from right to left by one search key candidate.

Similarly, when the right arrow icon 643 is tapped, the control unit 120 scrolls the search key candidate display 641 from left to right by one search key candidate. Repeating the tapping of the right arrow icon 643 allows the search key candidate display 641 to be sequentially scrolled from left to right by one search key candidate.

When desired search key candidate information is displayed by scrolling the search key candidate display 641 with the left arrow icon 642 or the right arrow icon 643, the search key candidate information is selected.

For example, if the item "New Haven" in the search key candidate display 641 is the search key candidate information which the user wants to specify as the search key in the screen in FIG. 7A, the user touches the position on the operation panel of the touch panel 107 corresponding to the position where the item "New Haven" is displayed with his/her finger or the like to perform the dragging operation (the drag operation or the flick operation).

The control unit 120 determines that the dragging operation has been performed from the position where the item "New Haven" is displayed on the basis of the coordinate data supplied from the touch panel 107 and the position where each display information is displayed on the display screen 6G.

In this case, the control unit 120 recognizes that the item "New Haven" has been selected as the search key and displays a display 644 of "New Haven" selected as the search key outside the search key candidate display 641 on the display screen 6G. With the display 644, the user can recognize that the item "New Haven" has been selected as the search key in the image pickup apparatus 100.

Similarly, another item belonging to the category "place" may be selected as the search key. In other words, multiple items (search key candidate information items) in the same category may be selected as the search keys.

If the user wants to terminate the image search after the item "New Haven" has been selected as the search key, the user selects the End icon 6A. In response to the selection of the End icon 6A by the user, the control unit 120 terminates the image search process and, for example, returns to the state in which the menu window is displayed. In this case, it is determined that the selected search key has not been selected.

If the user wants to select another category after the items "Mr. A" and "New Haven" have been selected as the search keys, the user selects the BK icon 6C. In response to the selection of the BK icon 6C by the user, the control unit 120 returns to the search key selection screen (3) described above with reference to FIG. 6B to allow the user to select the category again. In this case, it is determined that the item "New Haven" has not been selected as the search key.

If the OK icon 6B is selected after the items "Mr. A" and "New Haven" have been selected as the search keys, the control unit 120 identifies the item "New Haven" selected in the screen in FIG. 7A as the search key.

Then, the control unit 120 creates a search key selection screen (5) which includes the display 631 of the item "Mr. A" and a display 651 of the item "New Haven" identified as the search keys and in which the category list display 611 is displayed again and displays the search key selection screen (5) on the display screen 6G of the display unit 106, as illustrated in FIG. 7B.

One or more search key candidate information items can be selected from one or more desired categories among the seven categories in the search key candidate information table as the search keys and the selected one or more search key candidate information items can be identified in the above manner.

Accordingly, it is possible to select multiple search key candidate information items from the same category as the search keys and to select one or more search key candidate information items from each of multiple categories as the search keys.

If the user wants to terminate the image search in the state in FIG. 7B, the user selects the End icon 6A. In response to the selection of the End icon 6A by the user, the control unit 120 terminates the image search and, for example, returns to the state in which the menu window is displayed. In this case, it is determined that the search key has not been selected.

If the user wants to select a search key again in the category "place", the user selects the BK icon 6C. In response to the selection of the BK icon 6C by the user, the control unit 120 returns to the search key selection screen (4) described above with reference to FIG. 7A to allow the user to select the search key in the category "place" again.

In this case, under the control of the control unit 120, the search key that has been selected can be cleared, the search key that has been selected can be cleared to select a new search key, or a search key can be additionally selected in addition to the search key that has been selected.

If the selection of the search key is finished in the state illustrated in FIG. 7B to perform the image search by using the selected search key, the user selects the OK icon 6B. In response to the selection of the OK icon 6B by the user, the control unit 120 clears the category list display 611 in the screen in FIG. 7B to allow the user to perform the image search.

In this case, the control unit 120 reads out the data about the images within the range set in the screen in FIG. 5A (the images within the search range) and controls the decompression processing unit 110, the display-image forming unit 111, and the display processing unit 105 in order to display the thumbnail images of the images within the search range on the entire display screen 6G in a random order. The control unit 120 waits for an instruction operation (touch operation) to instruct start of the image search on the display (the display 631 or the display 651 in the screen in FIG. 7B) of the selected search key.

After the search key is selected by the user and the selected search key is identified in the image pickup apparatus 100 in the above manner, it is possible to perform the image search. In the image pickup apparatus 100 of the present embodiment, as illustrated in FIG. 6B and FIG. 7B, the image search is started in response to the touch of the display of the search key item identified as the search key by the user with his/her finger or the like.

Specifically, the displays of the search key items correspond to the display 631 of the item "Mr. A" and the display 651 of the "New Haven". When the control unit 120 detects that the user touches any of the displays of the identified search key items with his/her finger or the like, the control unit 120 starts the image search.

The process of selecting the search key described above with reference to FIGS. 5A to 7B is only an example. A desired search key may be selected from the search key candidate information items in other manners.

[Example of Screen Transition in Image Search]

An example of screen transition when the image search is performed by using the search key selected by the user in the above manner will now be described. FIGS. 8A to 10B illustrate examples of how the screen transition is performed when the image search is performed in the state in which two search keys are selected in the manner described above with reference to FIGS. 5A to 7B.

Figure 8A:
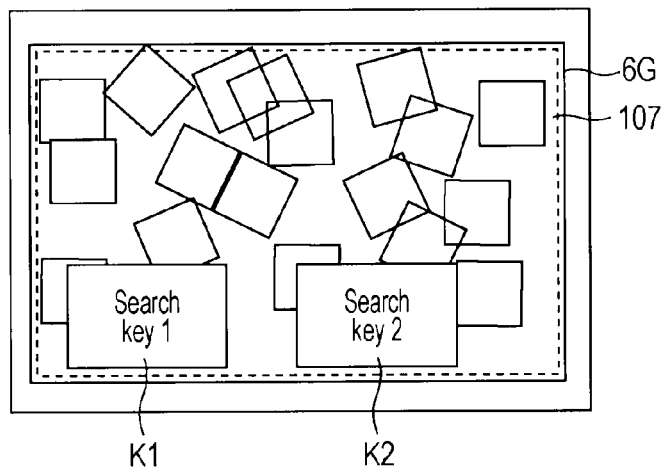
FIGS. 8A to 8C illustrate an example of screen transition when the image search is performed in a state in which two search keys are selected.

When two desired search keys are selected and the OK icon 6B is selected to determine the selected search keys in the above manner, the initial state of an image search screen is displayed, as illustrated in FIG. 8A.

In the initial state of the image search screen illustrated in FIG. 8A, search key displays (search key icons) K1 and K2 corresponding to the search keys selected by the user are displayed and the images within the search range are displayed in a random order.

The search key that is selected by the user and that corresponds to the search key display K1 is hereinafter referred to as a search key k1 and the search key that is selected by the user and that corresponds to the search key display K2 is hereinafter referred to as a search key k2.

Figure 8B:
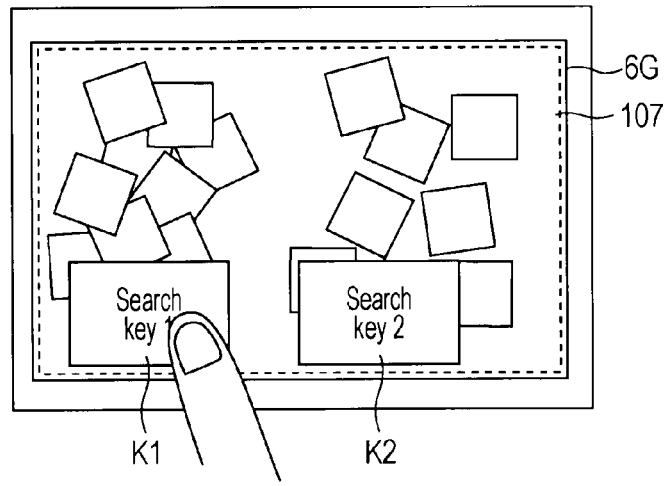

If the image search using the search key k1 corresponding to the search key display K1, among the two search keys, is to be performed, the user touches the position on the touch panel 107 corresponding to the position of the search key display K1 with his/her finger or the like, as illustrated in FIG. 8B.

The control unit 120 detects that the search key display K1 is specified on the basis of the coordinate data supplied from the touch panel 107 and the display information displayed at the position on the display screen corresponding to the position on the operation panel indicated by the coordinate data and recognizes that an instruction to perform the image search is issued.

In this case, the control unit 120 uses the search key k1 corresponding to the instructed search key display K1 to extract image files having the keywords matched with the search key from the image files within the search range.

The control unit 120 collectively displays the thumbnail images of the image files that are extracted from the image files within the search range and that are matched with the search key k1 in a predetermined part (for example, near the search key display K1) on the display screen 6G.

The thumbnail images of the image files that are within the search range but are not extracted as the image files matched with the search key are displayed in a part away from the predetermined part on the display screen 6G.

As a result, as illustrated in FIG. 8B, the images of the image files having the keywords matched with the search key k1 are collectively displayed near the search key display K1 and the images of the remaining image files are displayed in a part away from the search key display K1.

In the display of the thumbnail images in the manner illustrated in FIG. 8B, the image processing is performed by the decompression processing unit 110, the display-image forming unit 111, and the display processing unit 105, which operate under the control of the control unit 120, and the thumbnail images subjected to the image processing are displayed on the display screen 6G of the display unit 106.

Specifically, the image data about the image files within the search range is decompressed in the decompression processing unit 110 and the image data subjected to the decompression is supplied to the display-image forming unit 111. The display-image forming unit 111, for example, decimates the supplied image data to generate thumbnail data.

Then, the display-image forming unit 111 generates image data, in which the thumbnail images having the keywords matched with the search key k1 are displayed near the position of the search key display K1 and the remaining thumbnail images are displayed in a part away from the search key display K1, under the control of the control unit 120.

This image data forms an image corresponding to one screen. An image signal to be supplied to the display processing unit 105 is generated from the image data and the generated image signal is supplied to the display processing unit 105. The display processing unit 105 generates an image signal for display to be supplied to the display unit 106 under the control of the control unit 120 and supplies the generated image signal for display to the display unit 106. As a result, the result of the image search is displayed on the display screen 6G of the display unit 106 in the manner illustrated in FIG. 8B.

If the thumbnail data used for displaying the thumbnail image has been already prepared in each image file, the prepared thumbnail data is used to achieve the display in FIG. 8B. Since it is not necessary to perform the decompression in the decompression processing unit 110 and the generation of the thumbnail data in the display-image forming unit 111 when the thumbnail data prepared in advance in each image file is used, the load on the image pickup apparatus 100 can be reduced.

The user can recognize that the image search has been performed by using the search key k1 corresponding to the search key display K1 and the result of the image search from the information displayed on the display screen 6G.

In addition, since the user can determine not only the outline of the images matched with the search key but also the outline of the images that are not matched with the search key, as illustrated in FIG. 8B, it is possible to realize the image search in a user-friendly manner.

Figure 8C:
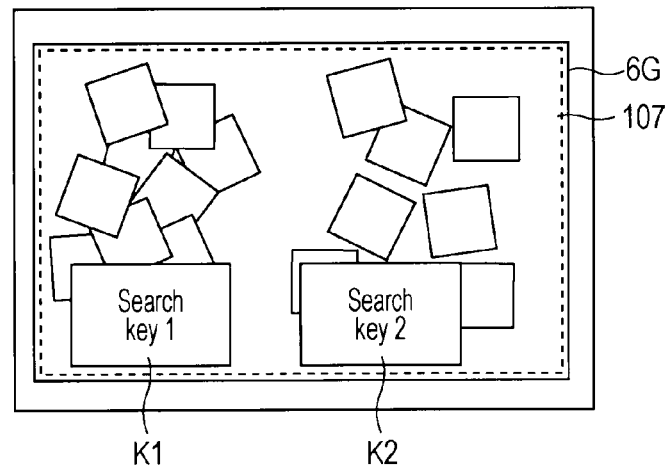

The control unit 120 keeps the display of the result of the image search within a predetermined time period T (for example, within a few seconds) since the contact of a finger of the user or the like with the search key display K1 was released, as illustrated in FIG. 8C. While the display is kept, the user can determine the result of the image search.

Figure 9A:
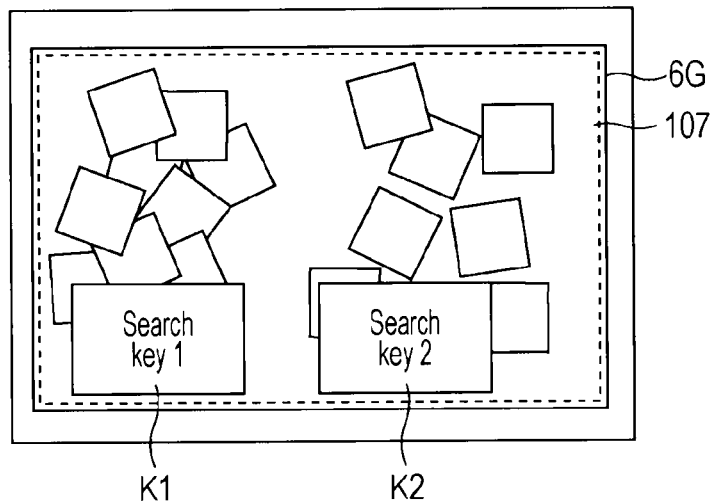
FIGS. 9A and 9B illustrate another example of the screen transition when the image search is performed in the state in which the two search keys are selected.

Specifically, it is assumed that the display of the result of the image search using the search key k1 corresponding to the search key display K is kept, as in an example in FIG. 9A. Performing an operation to surround the images displayed near the search key display K1 as the images matched with the search key k1 in the state illustrated in FIG. 9A allows the images to be determined to be the result of the image search.

Figure 9B:
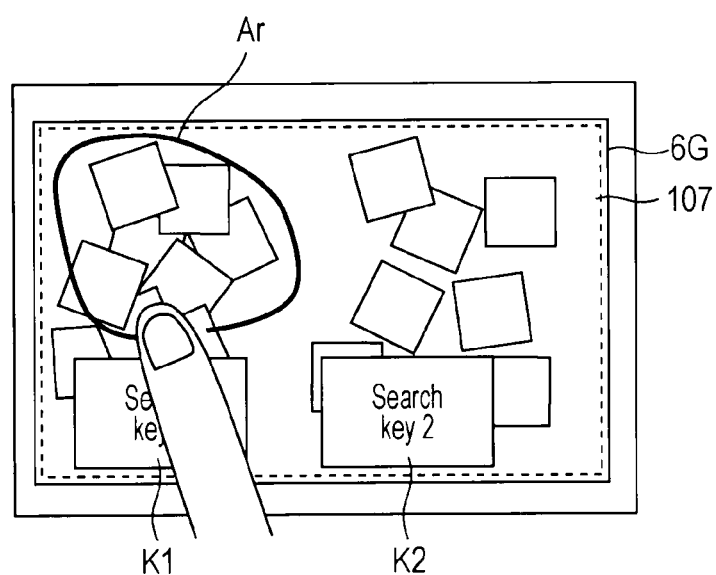

In the operation to surround the images, as illustrated in FIG. 9B, the drag operation is performed while a finger of the user or the like is in contact with the operation panel of the touch panel 107 to surround the images resulting from the image search, as shown by an area Ar in FIG. 9B.

The images within the area Ar are determined to be the images resulting from the image search (the images having the keyword on the search key k1). The determination of the images resulting from the image search means that the images are stored in, for example, the RAM 123 serving as the working area as the targets for storage and reproduction.

Although the images displayed within the area Ar specified by the user are determined to be the images resulting from the image search in the example in FIG. 9B, the method of determining the images is not restricted to the one in FIG. 9B. The images resulting from the image search may be determined in some other manners.

For example, only the collection of images that are completely included in the specified area Ar may be determined to be the images resulting from the image search. In this case, the images that are partially out of the area Ar are excluded from the images resulting from the image search.

Alternatively, the collection of images that are partially included in the specified area Ar may be determined to be the images resulting from the image search. Specifically, the collection of images that are not completely included in the specified area Ar but are at least partially positioned within the specified area Ar may be determined to be the images resulting from the image search.

Alternatively, all the image data items that are displayed near the specified area Ar and that have the keywords matched with the search key k1 may be determined to be the images resulting from the image search. In this case, all the image data items having the keywords matched with the search key k1 are determined to be the images resulting from the image search, regardless of whether the images are within the specified area Ar.

As described above, the range in which the images resulting from the image search are determined can be varied. The images resulting from the image search can be determined when any instruction operation is performed by the user.

When the images resulting from the image search are determined in the above manner, the state in FIG. 9B is kept. A certain operation can be performed on each image file determined to be the images resulting from the image search to store the image file in a new folder or to reproduce the image data in the image file, as described above.

If a certain clear operation is performed after the images resulting from the image search are determined, the determination is cleared and, for example, the image display is returned to the initial state after the predetermined time period, as described below.

If the predetermined time period T has elapsed since the contact of a finger of the user or the like with the search key display K1 was released, as illustrated in FIG. 8C, the control unit 120 clears the display of the result of the image search and returns the displayed image to the initial state of the search screen.

Figure 10A:
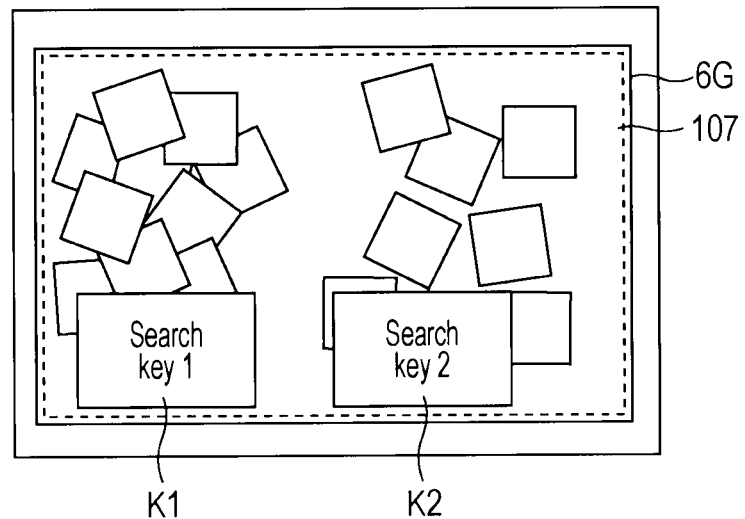
FIGS. 10A and 10B illustrate another example of the screen transition when the image search is performed in the state in which the two search keys are selected.
Figure 10B:
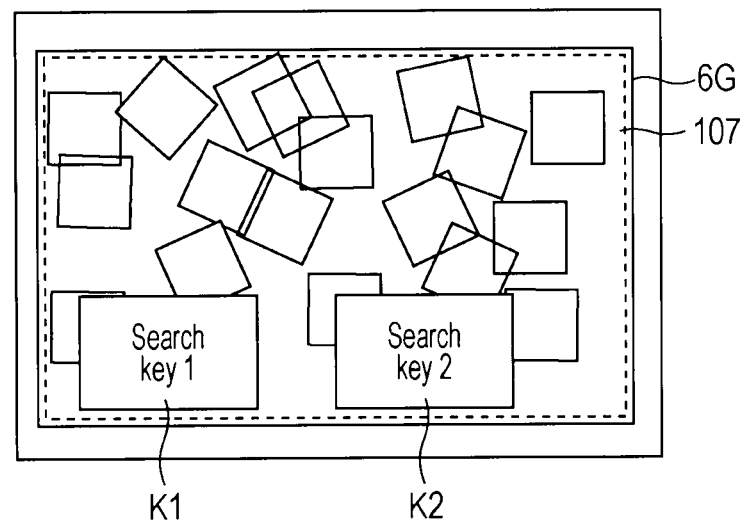

For example, it is assumed that the display of the result of the image search using the search key k1 corresponding to the search key display K1 is kept, as in an example in FIG. 10A. After the state in FIG. 10A is kept for the predetermined time period T, the control unit 120 returns the displayed image to the initial state of the search screen, as illustrated in FIG. 10B.

Specifically, the control unit 120 controls the decompression processing unit 110, the display-image forming unit 111, and the display processing unit 105 in order to return to the display state in which the thumbnail images of the image files within the search range are displayed on the entire display screen in a random order.

Accordingly, if the user performs no operation and the determination operation has not been performed within the predetermined time period T since the result of the image search was displayed, the displayed image can be automatically returned to the initial state of the search screen.

Then, for example, the search key display K2 can be instructed to perform the image search corresponding to the search key k2. Alternatively, a search key can be selected again in the manner described above with reference to FIGS. 5A to 7B by performing a certain operation to additionally select the search key.

Although the displayed image is returned to the initial state of the search screen if the predetermined time period T has elapsed since the result of the image search was displayed and the contact of a finger of the user or like with the search key display was released, the time when the displayed image is returned to the initial state of the search screen is not restricted to the above case.

For example, the displayed image may be returned to the initial state of the search screen if a position on the operation panel of the touch panel 107 outside the search key display is tapped. Alternatively, the displayed image may be returned to the initial state of the search screen if another search key display is tapped.

Alternatively, if an operation on a button switch, etc. that is provided to clear the display of the result of the image search is received, the displayed image may be returned to the initial state of the search screen. As described above, the display of the result of the image search may be cleared in response to a certain operation to be returned to the initial state of the search screen.

[Detailed Description of Image Search Process]

Figure 12:
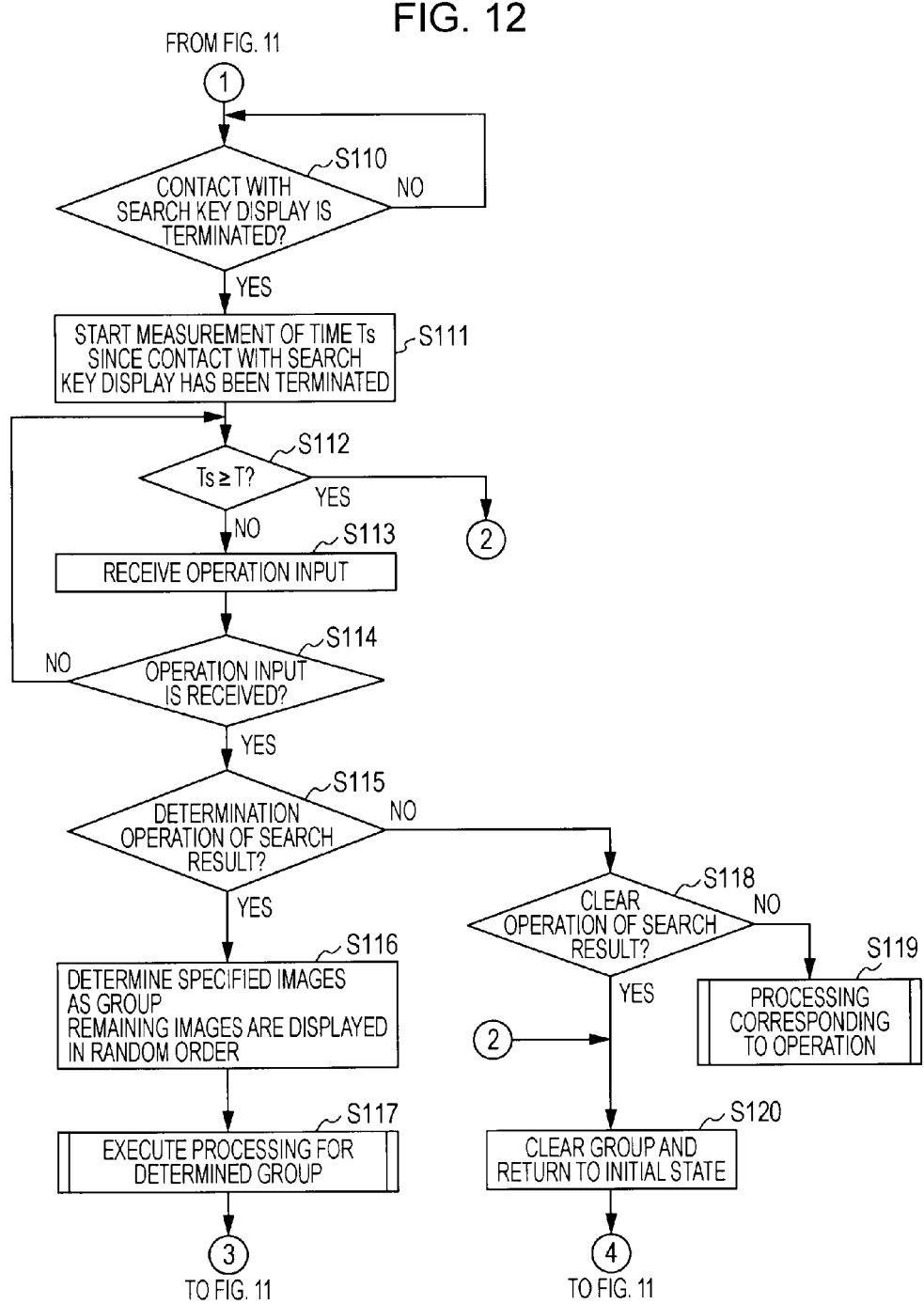
FIG. 12 is a flowchart following the flowchart in FIG. 11.

An image search process performed in the image pickup apparatus 100 of the present embodiment will now be described. FIGS. 11 and 12 are flowcharts illustrating an example of the image search process performed in the image pickup apparatus 100.

The process in the flowcharts in FIGS. 11 and 12 is mainly performed by the control unit 120 in the image pickup apparatus 100 if the menu item "Image Search" is selected from the displayed menu in the manner described above.

After the process in FIGS. 11 and 12 has been performed, in Step S101, the control unit 120 performs the setting of the search range of the images and the selection of the search key in the manner described above with reference to FIGS. 5A to 7B.

In Step S102, the control unit 120 determines whether a termination operation is performed in Step S101. If the control unit 120 determines in Step S102 that the termination operation is performed, then in Step S103, the control unit 120 performs a process of terminating the image search. Then, the process in FIGS. 11 and 12 is terminated to, for example, return to the menu window.

If the control unit 120 determines in Step S102 that the termination operation is not performed, then in Step S104, the control unit 120 determines that the search key is appropriately selected and displays the initial screen of the image search illustrated in FIG. 8A.

Specifically, in Step S104, the control unit 120 displays the thumbnail images of the image files within the search range set in Step S101 on the display screen 6G in a random order and displays the search key display corresponding to the selected search key.

In Step S105, the control unit 120 receives an operation input by the user with the touch screen 108 or the like. In Step S106, the control unit 120 determines whether an operation input is received.

If the control unit 120 determines in Step S106 that no operation input by the user is received, the process goes back to Step S105 to wait for an operation input by the user.

If the control unit 120 determines in Step S106 that an operation input by the user is received, then in Step S107, the control unit 120 determines whether the search key display corresponding to the selected search key is instructed by the user.

If the control unit 120 determines in Step S107 that the search key display K1 corresponding to the selected search key is not instructed by the user, then in Step S108, the control unit 120 performs processing corresponding to the operation input received in Step S105.

A variety of processing can be performed in Step S108 in accordance with the operation input by the user. For example, the search key can be changed or added.

If the control unit 120 determines in Step S107 that the search key display corresponding to the selected search key is instructed by the user, then in Step S109, the control unit 120 performs the image search using the search key corresponding to the instructed search key display and displays the result of the image search.

Specifically, in Step S109, the control unit 120 collectively displays the thumbnail images of the image files having the keywords matched with the search key in a certain part on the display screen 6G, as described above with reference to FIG. 8B. Then, the process goes to the steps in FIG. 12.

Referring to FIG. 12, in Step S110, the control unit 120 determines whether the contact of a finger of the user or the like with the search key display is terminated. If the control unit 120 determines in Step S110 that the contact of a finger of the user or the like with the search key display is continued, Step S110 is repeated to wait for the termination of the contact.

If the control unit 120 determines in Step S110 that the contact of a finger of the user or the like with the search key display is terminated, then in Step S111, the control unit 120 uses the functions of the clock circuit to start to measure a time Ts since the contact of a finger of the user or the like with the search key display has been terminated. As described above, the clock circuit is included in the image pickup apparatus 100, although not illustrated in FIG. 1.

In Step S112, the control unit 120 determines whether the time Ts when the measurement is started in Step S111 is equal to or longer than the predetermined time period T. If the control unit 120 determines in Step S112 that the time Ts is not equal to or longer than the predetermined time period T, then in Step S113, the control unit 120 receives an operation input by the user.

In Step S114, the control unit 120 determines whether an operation input by the user is received. If the control unit 120 determines in Step S114 that no operation input by the user is received, the process goes back to Step S112 to repeat the steps from Step S112.

If the control unit 120 determines in Step S114 that an operation input by the user is received, then in Step S115, the control unit 120 determines whether the received operation input is an operation to determine the search result.

If the control unit 120 determines in Step S115 that the received operation input is the operation to determine the search result, then in Step S116, the control unit 120 determines the instructed images as a group and causes the remaining images to be displayed in a random order. Step S116 is the process described above with reference to FIGS. 9A and 9B.

In Step S117, the control unit 120 performs processing on the images in the determined group. For example, the control unit 120 stores the images in the determined group in a certain image folder or reproduces the images in the determined group. Then, for example, the control unit 120 repeats the process from Step S101 in FIG. 11.

If the control unit 120 determines in Step S115 that the received operation input is not the operation to determine the search result, then in Step S118, the control unit 120 determines whether the received operation input is an operation to clear the search result.

If the control unit 120 determines in Step S118 that the received operation input is not the operation to clear the search result, then in Step S119, the control unit 120 performs the processing corresponding to the received operation input.

If the control unit 120 determines in Step S118 that the received operation input is the operation to clear the search result, then in Step S120, the control unit 120 clears the display of the result of the image search and returns to the initial state of the image search, as illustrated in FIG. 10B.

After Step S120, the control unit 120 may repeat the steps beginning from Step S105 in FIG. 11 to perform the image search corresponding to the displayed search key display or may add a new search key to perform the image search using the new search key.

If the control unit 120 determines in Step S112 that the time Ts is equal to or longer than the predetermined time period T, then in Step S120, the control unit 120 clears the display of the result of the image search in the manner illustrated in FIGS. 10A and 10B and returns to the initial state of the image search illustrated in FIG. 10B. Then, the control unit 120 repeats the steps beginning from Step S105 in FIG. 11.

As described above, in the image pickup apparatus 100 of the present embodiment, only selecting the search key from the available search key candidate information to instruct the selected search key allows the image search to be performed.

The display of the result of the image search can be automatically cleared without the operation by the user if the determination operation is not performed within the predetermined time period since the operation to instruct the search key has been cleared.

Accordingly, for example, the user can perform the image search using the next search key without clearing the display of the result of the image search.

Although either of the two selected search keys, which is instructed by the user, is used to perform the image search in the example described above with reference to FIGS. 8A to 10B, the image search is not restricted to the above one. The image search using the two selected search keys may be performed.

Figure 13A:
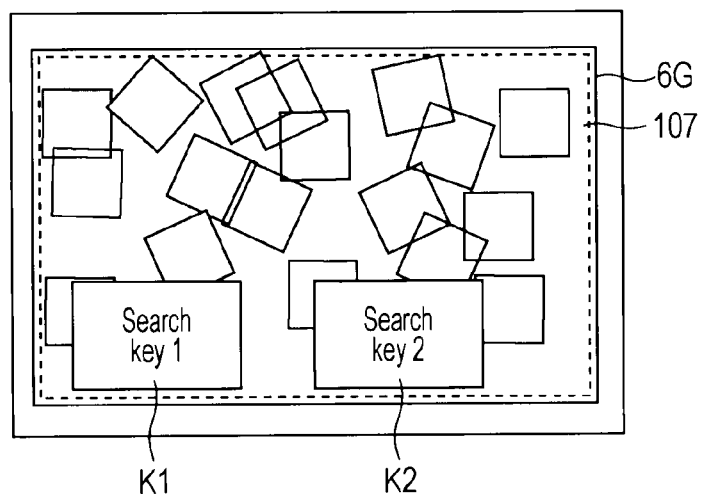
FIGS. 13A and 13B illustrate an example of how to perform the image search using two selected search keys.
Figure 13B:
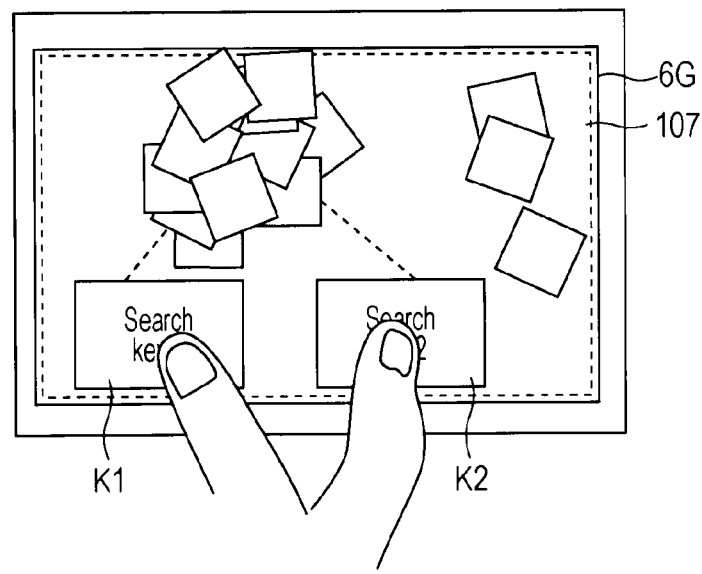

FIGS. 13A and 13B illustrate an example of how to perform the image search using both of the two selected search keys. FIG. 13A illustrates a state in which the search key display K1 and the search key display K2 corresponding to the two search keys selected by the user are displayed.

FIG. 13B illustrates a state in which the user touches both of the search key display K1 and the search key display K2 with his/her fingers or the likes. Specifically, the user touches the positions on the operation panel of the touch panel 107 corresponding to the respective positions of the search key display K1 and the search key display K2 with his/her fingers or the likes.

In this case, the touch panel 107 supplies the coordinate data about each of the two touched positions to the control unit 120. The control unit 120 detects that the search key k1 and the search key k2 are simultaneously instructed on the basis of the coordinate data supplied from the touch panel 107 and the display information displayed at the positions on the display screen corresponding to the positions on the operation panel indicated by the coordinate data.

The control unit 120 searches for and extracts the image files having both of the search key k1 and the search key k2 as the keywords and collectively displays the thumbnail images of the extracted image files on the display screen 6G, as illustrated in FIG. 13B.

The thumbnail images of the image files that do not have both of the search key k1 and the search key k2 as the keywords are displayed in a random order in a part away from the images that are collectively displayed.

Such display can be performed by the decompression processing unit 110, the display-image forming unit 111, and the display processing unit 105 under the control of the control unit 120, as in the example described above with reference to FIGS. 8A to 8C.

It is possible to flexibly perform the image search using multiple search keys in the above manner. Although the example in which the two search keys are used is described above, the image search is not restricted to the above example. Three or more search keys may be selected to perform the image search by simultaneously using the search keys.

Although the image files satisfying both of the search key k1 and the search key k2 are searched for in the example in FIGS. 13A and 13B, the image search is not restricted to the above example. The image files satisfying either of the search key k1 and the search key k2 may be searched for.

In other words, whether the image files satisfying all the multiple search keys are searched for or whether the image files satisfying at least one of the multiple search keys are searched for can be set in advance in the image pickup apparatus 100.

The user may input and set which search method is used in the image pickup apparatus 100 upon start of the image search.

[First Modification]

The image files having the keywords matched with at least one search key are searched for in the image pickup apparatus 100 of the above embodiment. In other words, information about the keywords is used as the search key in the above embodiment.

However, the search key is not restricted to information about the keywords. An image itself, specifically, information indicating the result of the image search may be used as the search key to search for similar images. In the image pickup apparatus 100 according to a first modification, images themselves are used as the search keys to perform the image search.

Figure 14A:
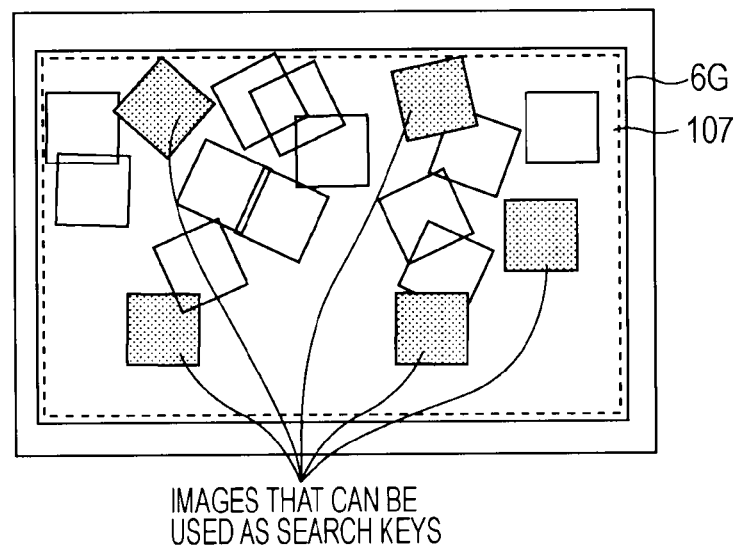
FIGS. 14A and 14B illustrate an example of how to perform the image search by using images as the search keys according to a first modification.
Figure 14B:
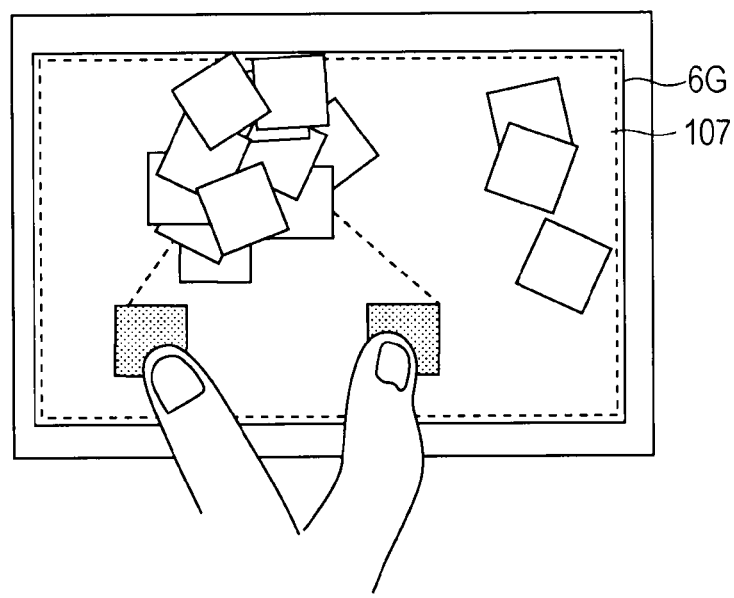

FIGS. 14A and 14B illustrate an example of how to perform the image search by using images as the search keys. In an example in FIG. 14A, images that can be used as the search keys are displayed in a distinguishable manner, for example, are highlighted.

As described above with reference to FIG. 2, the image analysis information resulting from the image analysis of the image data in each image file is added to the image file as the metadata. The image analysis information indicates characteristics of the image corresponding to each image data, which are digitalized by various methods including the edge detection and the color analysis, as described above. The image analysis information can be used to compare the similarity in composition or object between images.

Accordingly, an image that is found as an image having a distinct feature as the result of the image search is made available as the search key. For example, an image including the face of a person on a large scale or an image of a building or landscape having a clear outline can be used as the search key.

Specifically, for example, a flag is added to the image file of an image that can be used as the search key in order to distinguish the image file of such an image from other image files. In this case, as illustrated in FIG. 14A, the thumbnail images of the images that can be used as the search keys are distinguishably displayed, for example, are highlighted.

FIG. 14B illustrates a state in which the user touches the positions on the operation panel of the touch panel 107 corresponding to the positions where the thumbnail images of desired images, among the thumbnail images of the images that can be used as the search keys, are displayed with his/her fingers or the likes.

In this case, the control unit 120 can determine which thumbnail images are specified as the search keys on the basis of the coordinate data supplied from the touch panel 107 and the thumbnail images displayed at the positions on the display screen corresponding to the positions on the operation panel indicated by the coordinate data.

The control unit 120 reads out the image analysis information from the image files corresponding to the specified thumbnail images and uses the image analysis information as the search key to extract the image files having the image analysis information similar to the search key. Then, the control unit 120 collectively displays the thumbnail images of the extracted image files in a certain part on the display screen, as illustrated in FIG. 14B.

In the example illustrated in FIG. 14B, the two thumbnail images are specified as the search keys. The images that are similar to the results of the image search of both of the two specified images are extracted in the example in FIG. 14B. However, the images that are similar to the result of the image search of either of the two specified images may be extracted depending on the instruction from the user.

As described above, images can be specified as the search keys to narrow down images by using, for example, a person or building in the specified images as the search condition. In other words, it is possible to extract images similar to the images specified as the search keys.

Although an image having a distinct feature as the result of the image search is identified in advance as the image that can be used as the search key, the image used as the search key is not restricted to the above one. For example, all the images may be specified as the search keys. In this case, it is not necessary to highlight the thumbnail images.

Alternatively, the user may set an image used as the search key in advance.

[Second Modification]

Also in a second modification, an image itself, specifically, information indicating the result of the image search can be used as the search key to search for similar images, as in the first modification described above. However, unlike the above first modification in which the entire image is used as the search key, there are cases in which the user wants to use only part of one image as the search key.

For example, there is a case in which the user wants to perform the image search based on the face of one person, among the faces of multiple persons in one image. In addition, there is a case in which the user wants to search for images that include different persons but have been captured at the same place.

Figure 15A:
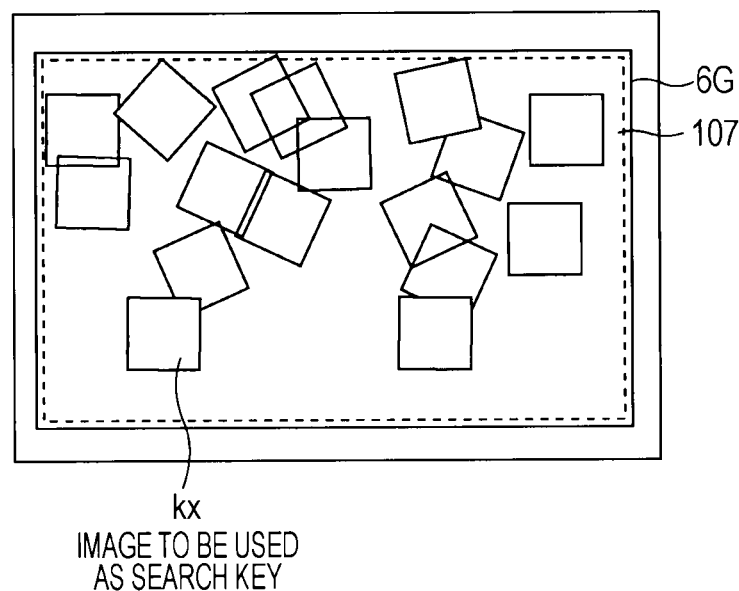
FIGS. 15A and 15B illustrate an example of how to perform the image search by using parts of one image as the search keys according to a second modification.
Figure 15B:
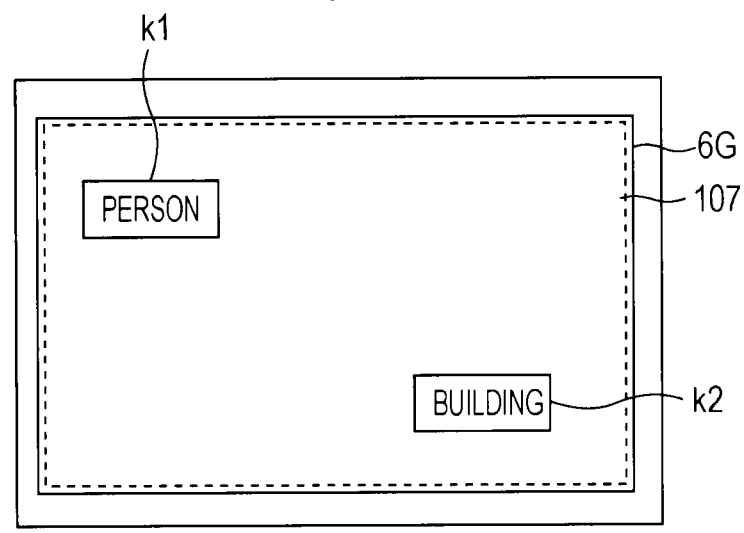

Accordingly, in the second modification, part of one image is made available as the search key. FIGS. 15A and 15B illustrate an example of how to perform the image search by using parts of one image as the search keys.

Referring to FIG. 15A, it is assumed that the user wants to use part of a thumbnail image kx displayed in a lower left part of the display screen 6G as the search key. In this case, the user taps the position on the operation panel of the touch panel 107 corresponding to the display position of the thumbnail image kx.

In response to the tap operation by the user, the touch panel 107 supplies the coordinate data corresponding to the position where the tap operation is performed to the control unit 120. The control unit 120 determines which thumbnail image is selected on the basis of the coordinate data supplied from the touch panel 107 and the thumbnail image on the display screen 6G corresponding to the instructed position.

Then, as illustrated in FIG. 15B, the control unit 120 displays the image corresponding to the thumbnail image selected by the user on the entire display screen 6G and surrounds parts of the image, which can be specified as the search keys, with frames, etc. to display the parts in a manner in which the user can select the parts.

The parts in the one selected image, which can be specified as the search keys, include a part that is determined to be the face of a person and a part that is determined to be a building having a distinct feature, as the result of the image analysis including the edge detection and the color analysis, as described above.

Information indicating the parts of the image, which can be specified as the search keys, is included in the image analysis information in each image file. The control unit 120 uses the image analysis information in the image file and controls the decompression processing unit 110, the display-image forming unit 111, and the display processing unit 105 in order to perform the display on the display screen 6G of the display unit 106 in the manner illustrated in FIG. 15B.

For example, tapping a person displayed part k1 in state in FIG. 15B allows the image of the person displayed part (the image analysis information on the person displayed part) to be set as the search key.

Performing a certain operation, for example, tapping a Return icon (not shown) displayed on the display screen 6G allows the displayed image to return to the state illustrated in FIG. 15A. When the user touches the position where the thumbnail image kx is displayed with his/her finger or the like in the state in FIG. 15A, the image search can be performed by using the person displayed part k1 included in the image as the search key.

Similarly, tapping a building displayed part k2 in the state in FIG. 15B allows the image of the building displayed part (the image analysis information on the building displayed part) to be set as the search key.

When the user touches the position where the thumbnail image kx is displayed with his/her finger or the like after the displayed image is returned to the state in FIG. 15A, the image search can be performed by using the building displayed part k2 included in the image as the search key.

Although the image search is performed after the displayed image is returned from the state in FIG. 15B to the state in FIG. 15A, the image search may be immediately performed in accordance with the specified part in the state in FIG. 15B to display the result of the image search.

As described above, part of one image can be used as the search key to perform the image search.

Figure 16A:
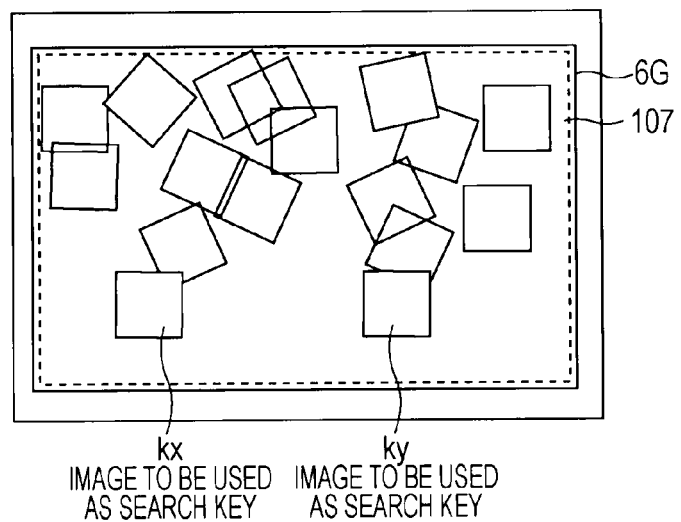
FIGS. 16A to 16C illustrate an example of how to perform the image search by using parts of multiple images as the search keys according to the second modification.
Figure 16B:
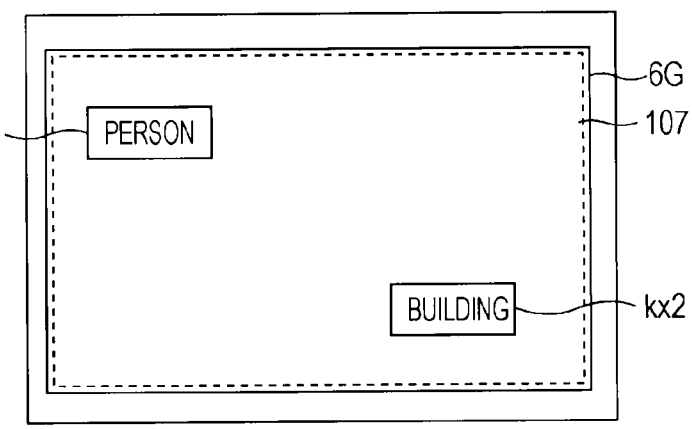
Figure 16C:
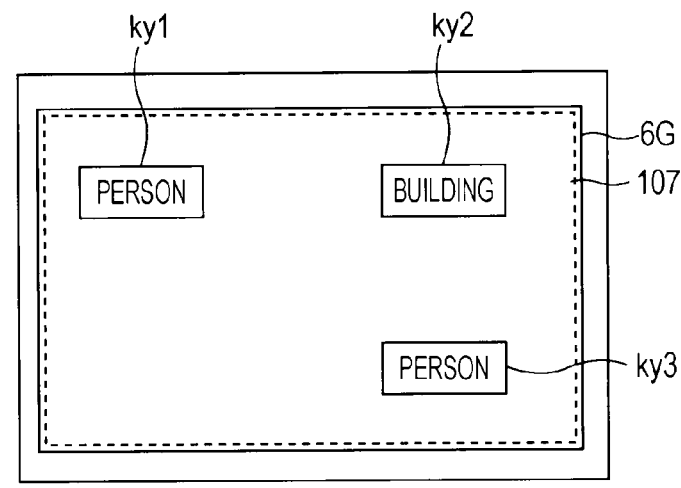

Parts of multiple images may be used as the search keys. FIGS. 16A to 16C illustrate an example of how to perform the image search by using parts of multiple images as the search keys.

Referring to FIG. 16A, it is assumed that the user wants to use part of a thumbnail image kx and part of a thumbnail image ky, which are displayed in lower parts of the display screen 6G, as the search keys.

In this case, first, the user taps the position on the operation panel of the touch panel 107 corresponding to the position where the thumbnail image kx is displayed. In response to the tap operation by the user, the control unit 120 determines that the thumbnail image kx is selected on the basis of the coordinate data supplied from the touch panel 107 and the display information displayed at the position on the display screen corresponding to the position on the operation panel indicated by the coordinate data, as described above.

Then, as illustrated in FIG. 16B, the control unit 120 displays the image corresponding to the selected thumbnail image kx on the entire display screen 6G and surrounds parts kx1 and kx2 of the image, which can be specified as the search keys, with frames, etc. to display the parts kx1 and kx2 in a manner in which the user can select the parts.

The display in FIG. 16B is achieved by reading out the image data and the result of the image analysis from the image file corresponding to the selected thumbnail image and processing the readout data in the decompression processing unit 110, the display-image forming unit 111, and the display processing unit 105.

The parts in the one selected image, which can be specified as the search keys, include a part that is determined to be the face of a person and a part that is determined to be a building having a distinct feature, as the result of the image analysis including the edge detection and the color analysis, as described above.

In response to, for example, a tap operation on the person displayed part kx1 by the user in the state in FIG. 16B, the control unit 120 recognizes which part is instructed and sets the image of the person displayed part (the image analysis information on the person displayed part) as the search key.

Performing a certain operation, for example, tapping the Return icon (not shown) displayed on the display screen 6G after the part used as the search key is selected in the first image kx in the above manner allows the displayed image to return to the state illustrated in FIG. 16A.

Next, the user taps the position on the operation panel of the touch panel 107 corresponding to the position where the thumbnail image ky is displayed. In response to the tap operation by the user, the control unit 120 determines that the thumbnail image ky is selected on the basis of the coordinate data supplied from the touch panel 107 and the display information displayed at the position on the display screen corresponding to the position on the operation panel indicated by the coordinate data.

Then, as illustrated in FIG. 16C, the control unit 120 displays the image corresponding to the selected thumbnail image ky on the entire display screen 6G and surrounds parts ky1, ky2, and ky3 of the image, which can be specified as the search keys, with frames, etc. to display the parts ky1, ky2, and ky3 in a manner in which the user can select the parts.

The display in FIG. 16C is also achieved by reading out the image data and the result of the image analysis from the image file corresponding to the selected thumbnail image and processing the readout data in the decompression processing unit 110, the display-image forming unit 111, and the display processing unit 105.

In response to, for example, a tap operation on the person displayed part ky1 by the user in the state in FIG. 16C, the control unit 120 recognizes which part is specified and sets the image of the person displayed part (the image analysis information on the person displayed part) as the search key.

Performing a certain operation, for example, tapping the Return icon (not shown) displayed on the display screen 6G after the part used as the search key is selected in the second image ky in the above manner allows the displayed image to return to the state illustrated in FIG. 16A.

When the user touches the positions where the thumbnail images kx and ky are displayed with his/her fingers or the likes in the state in FIG. 16A, the image search can be performed by using the person displayed parts kx1 and ky1 as the search keys.

In other words, the part kx1 of the image kx and the part ky1 of the image ky can be used as the search keys to perform the image search. In this case, it is possible to search for an image including a part that is similar to both of the part kx1 of the image kx and the part ky1 of the image ky or to search for an image including a part that is similar to either of them.

In addition, if multiple parts that can be selected exist in one image, multiple parts among the parts that can be selected may be selected as the search keys.

The parts in the one selected image, which can be specified as the search keys, include a part that is determined to be the face of a person and a part that is determined to be a building having a distinct feature, as the result of the image analysis including the edge detection and the color analysis in the above description.

However, the parts in the one selected image, which can be specified as the search keys, are not restricted to the above ones. For example, a part within a range specified by the user in the image of an image file recorded on the recording medium 135 may be set as the search key.

Although the image analysis information in each image file is used to perform the image search in the first and second modifications described above with reference to FIGS. 14A to 16C, the image search method is not restricted to the above one. If the control unit 120 in the image pickup apparatus 100 has a higher processing capability, the image analysis may be performed on each image to perform the image search on the basis of the result of the image analysis.

In other words, after the image analysis information that is to be actually used as the search key is acquired by performing the image analysis on a specified image, the result of the image analysis may be compared with the image analysis information acquired as the search key while performing the image analysis on each image within the search range to perform the image search.

[Third Modification]

The images resulting from the image search are collectively displayed in a certain part (for example, near the instructed search key display) on the display screen 6G in the above embodiments. However, the display method of the images resulting from the image search is not restricted to the above one. FIGS. 17A to 18B illustrate other examples of how to display the images resulting from the image search according to a third modification.

Figure 17A:
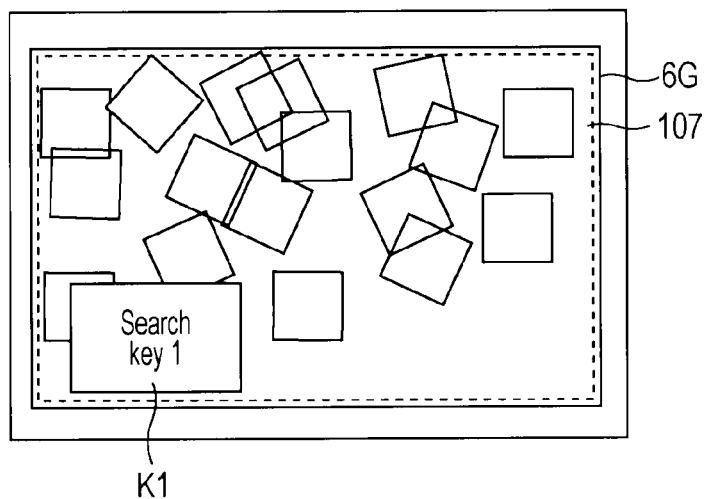
FIGS. 17A and 17B illustrate an example of how to display the result of the image search according to a third modification.

FIG. 17A illustrates a state in which the search key is selected and the search key display K1 is made in the image pickup apparatus 100 to enable the image search. In this state, the user not only touches the search key display K1 with his/her finger or the like but also performs the drag operation with the search key display K1 touched with his/her finger or the like.

Figure 17B:
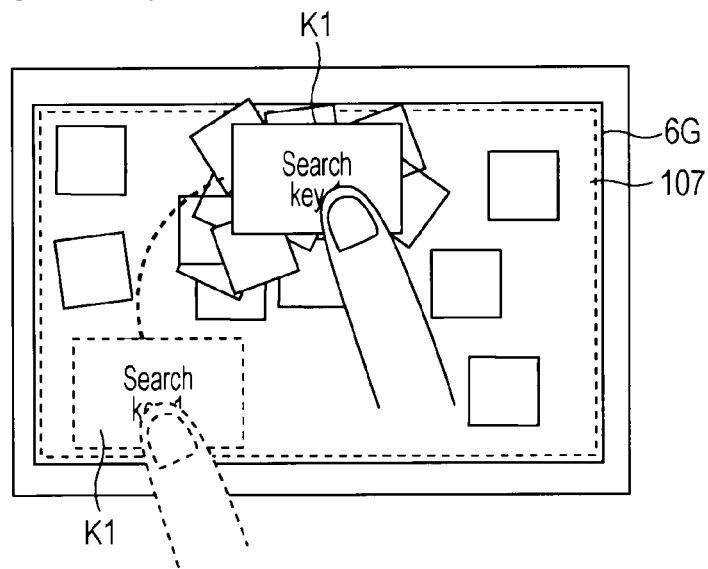

In response to the drag operation by the user, the image search is performed by using the search key corresponding to the search key display K1. The control unit 120 collectively displays the thumbnail images of images matched with the search key around the search key display K1 that is being moved on the display screen 6G, as illustrated in FIG. 17B.

This presents to the user an image in which the search key display K1 serves as a magnet and the thumbnail images of the images matched with the search key serve as metals attracted to the magnet.

This display can be realized by forming the displayed image and controlling the display on the basis of the result of the image search performed by the control unit 120 (the images matched with the search key) and the position of the search key display K1 on the display screen 6G.

Specifically, this display can be realized by the control unit 120 that controls the decompression processing unit 110, the display-image forming unit 111, and the display processing unit 105 in order to display the thumbnail images corresponding to the image data resulting from the image search in association with the position of the search key display K1.

Since the search key display K1 moves in accordance with the drag operation by the user, the search result can be updated in accordance with the position of the search key display K1 at predetermined timing to allow the thumbnail images of the images resulting from the image search to follow the search key display K1.

Also in the display mode in FIGS. 17A and 17B, the thumbnail images resulting from the image search are kept being collectively displayed within the predetermined time period T since the user released his/her finger or the like from the search key display K1.

In the example in FIGS. 17A and 17B, the result of the image search can be displayed in accordance with the movement of the search key display.

Figure 18A:
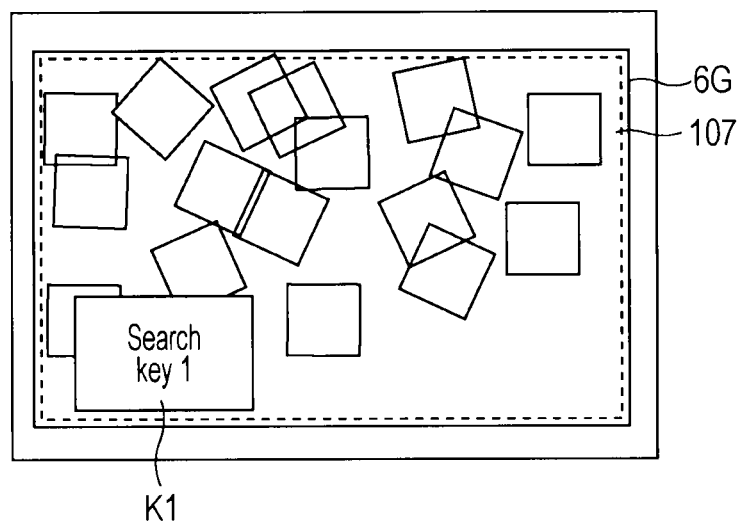
FIGS. 18A and 18B illustrate another example of how to display the result of the image search according to the third modification.
Figure 18B:
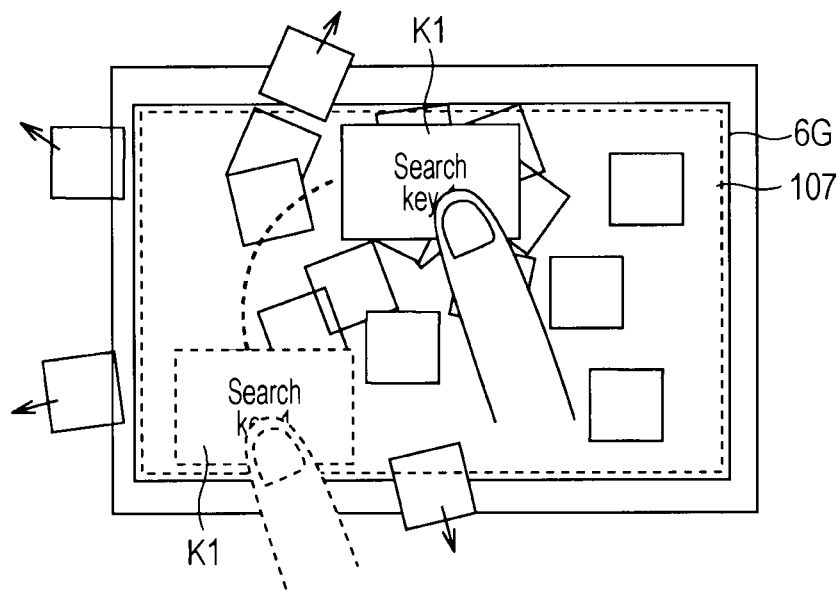

The result of the image search may be displayed in a manner illustrated in FIGS. 18A and 18B in which the thumbnail images of the images that are not matched with the search key are flicked out from the display screen 6G.

FIG. 18A illustrates a state in which the search key is selected and the search key display K1 is made in the image pickup apparatus 100 to enable the image search. In this state, the user not only touches the search key display K1 with his/her finger or the like but also performs the drag operation with the search key display K1 touched with his/her finger or the like.

In response to the drag operation by the user, the image search is performed by using the search key corresponding to the search key display K1. The control unit 120 causes the search key display K1 that is being moved on the display screen 6G to flick out the thumbnail images of the images that are not matched with the search key, as illustrated in FIG. 18B. The control unit 120 leaves only the thumbnail images of the images matched with the search key on the display screen 6G.

This presents to the user an image in which the search key display K1 serves as a magnet and the thumbnail images of the images that are not matched with the search key serve as reverse-polarity magnets repelling the magnet.

This display can be realized by forming the displayed image and controlling the display on the basis of the result of the image search performed by the control unit 120 and the position of the search key display K1 on the display screen 6G.

Specifically, this display can be realized by the control unit 120 that controls the decompression processing unit 110, the display-image forming unit 111, and the display processing unit 105 in order to identify the thumbnail images of the images that are not matched with the search key on the basis of the result of the image search and to clear the display of the thumbnail images of the images that are not matched with the search key from the display screen 6G in association with the position of the search key display K1.

Since the search key display K1 moves in accordance with the drag operation by the user, the search result can be updated in accordance with the position of the search key display K1 at predetermined timing to allow the thumbnail images of the images that are not matched with the search key to be flicked out from the display screen 6G.

Also in the display mode in FIGS. 18A and 18B, only the thumbnail images of the images that are matched with the search key are kept being displayed on the display screen 6G within the predetermined time period T since the user released his/her finger or the like from the search key display K1.

Also in the example in FIGS. 18A and 18B, the result of the image search can be displayed in accordance with the movement of the search key display.

In order to realize the display modes described above with reference to FIGS. 17A to 18B, the display position, the display angle, and the movement distance of the thumbnail images can be varied to achieve a natural display mode that does not bring discomfort to the user.

[Fourth Modification]

The result of the image search can be determined by surrounding the images that are matched with the search key and are collectively displayed as the result of the image search in the above embodiments, as described above with reference to FIGS. 9A and 9B.

However, the operation to determine the result of the image search is not restricted to the above one and the result of the image search can be determined by various other determination operations. FIGS. 19 to 24B illustrate examples of how to determine the result of the image search according to a fourth modification.

Figure 19:
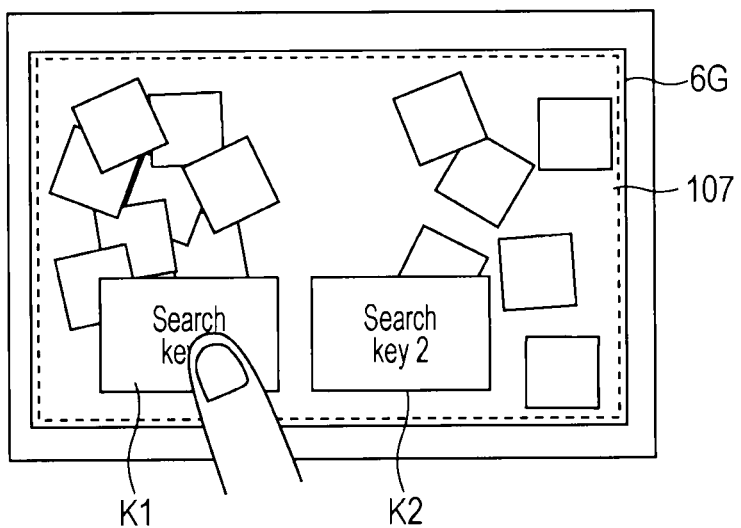
FIG. 19 illustrates an example of how to determine the result of the image search according to a fourth modification.

FIG. 19 illustrates a state in which, in response to a touch operation by the user on the search key display K1 with his/her finger or the like, the search for images matched with the search key k1 corresponding to the search key display K1 is started and the thumbnail images of the images matched with the search key k1 are collectively displayed.

In this case, keeping contact of a finger of the user or the like with the search key display K1 for a time period longer than the predetermined time period T causes the images corresponding to the thumbnail images that are collectively displayed to be determined to be the result of the image search.

In other words, it is possible for the user to perform the image search using the search key k1 corresponding to the search key display K1 and determine the result of the image search only by keeping contact of his/her finger or the like with a desired search key display.

The control unit 120 can realize the determination operation in the example in FIG. 19 only by managing the time during which the user keeps touching the search key display with his/her finger or the like.

The determination operation in FIG. 19 is very simple but it takes a time longer than the predetermined time period T constantly to determine the result of the image search. However, there are cases in which the user wants to determine the result of the image search as soon as possible. Determination operations of the result of the image search described below can be performed by the user at arbitrary timing.

Figure 20A:
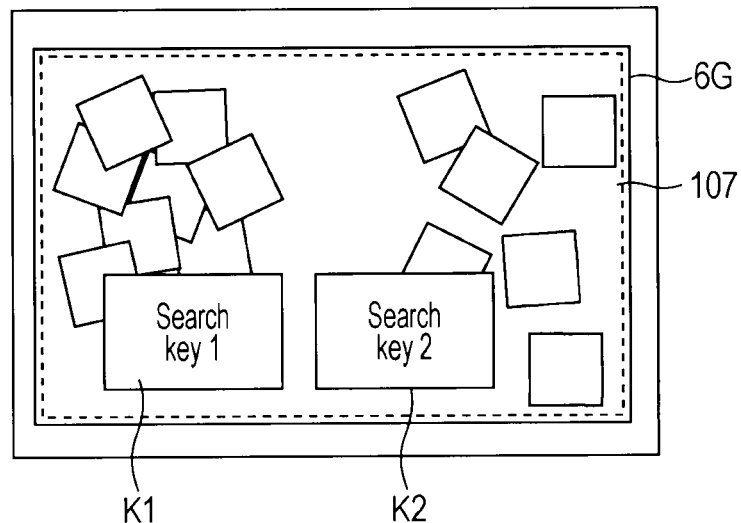
FIGS. 20A and 20B illustrate another example of how to determine the result of the image search according to the fourth modification.
Figure 20B:
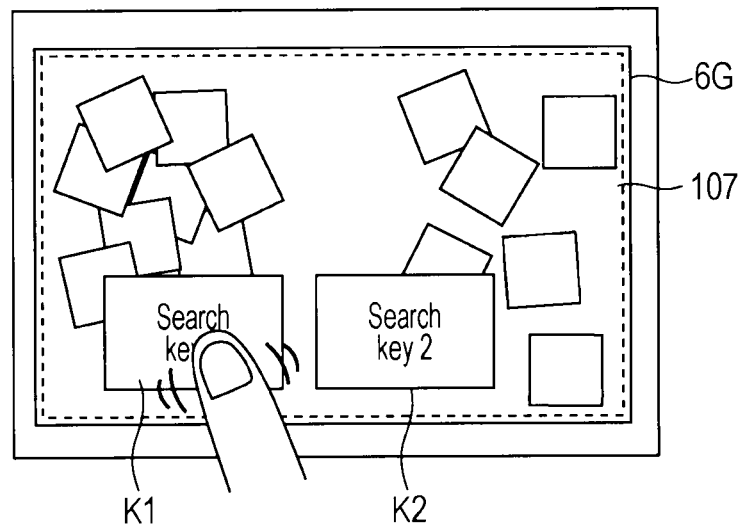

FIGS. 20A and 20B illustrate a first example of the determination operation of the result of the image search, which can be performed by the user at arbitrary timing. FIG. 20A illustrates a state in which the display of the result of the image search using the search key k1 corresponding to the search key display K1 is kept.

When the search key display K1 is double tapped in the state in FIG. 20A in a manner illustrated in FIG. 20B, the images displayed near the search key display K1 are determined to be the result of the image search.

In the example in FIGS. 20A and 20B, the user can only double tap the search key display K1 to be used to determine the result of the image search.

In this case, the control unit 120 only determines the result of the image search when the control unit 120 detects that the double operation is performed on the instructed search key display to start the image search on the basis of the coordinate data supplied from the touch panel 107, and it is not necessary for the control unit 120 to perform complicated processing.

Figure 21A:
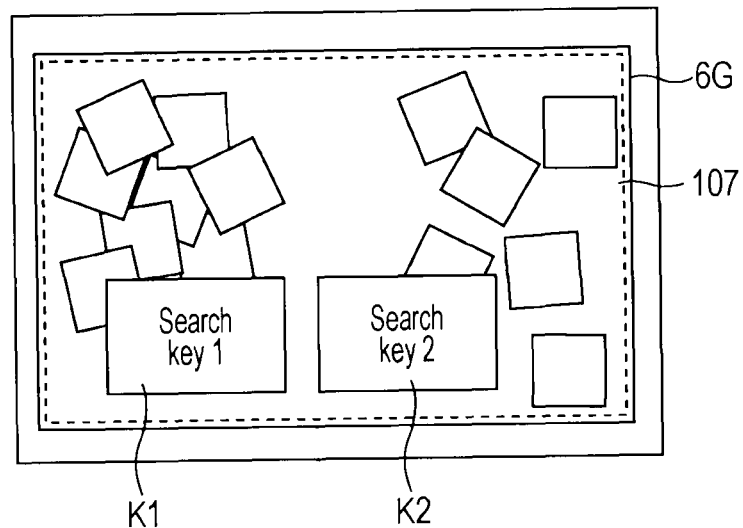
FIGS. 21A and 21B illustrate another example of how to determine the result of the image search according to the fourth modification.
Figure 21B:
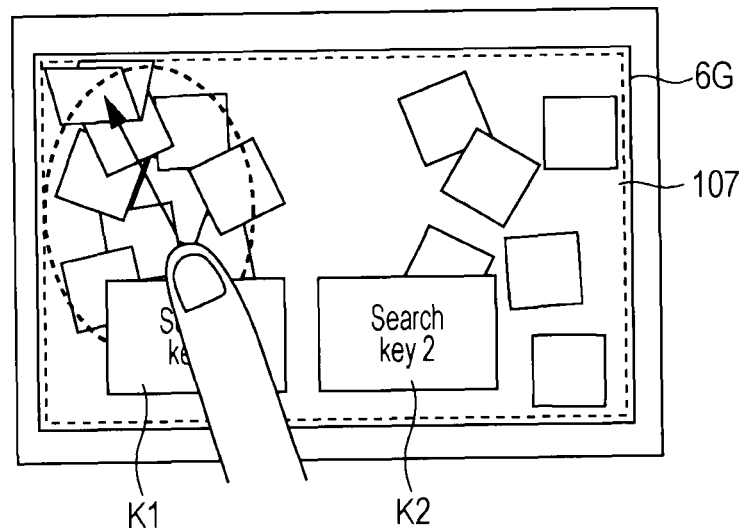

FIGS. 21A and 21B illustrate a second example of the determination operation of the result of the image search, which can be performed by the user at arbitrary timing. FIG. 21A illustrates a state in which the display of the result of the image search using the search key k1 corresponding to the search key display K1 is kept.

The corresponding image folder icon is also displayed in the state in FIG. 21A, and the user performs the drag operation on the images that are collectively displayed as the result of the image search with his/her finger or the like in a manner shown by an arrow in FIG. 21B to store the images in the image folder. As a result, the images displayed near the search key display K1 are determined to be the result of the image search.

In the example in FIGS. 21A and 21B, the user only can perform the drag operation on the images that are collectively displayed to allow the result of the image search to be determined and to allow the images to be stored in the image folder. The image folder may be automatically displayed or may be displayed in response to a certain operation, for example, a tap operation on the images that are collectively displayed.

Also in this case, the control unit 120 only determines the result of the image search when the control unit 120 detects that the drag operation is performed on the images that are collectively displayed on the basis of the coordinate data supplied from the touch panel 107, and it is not necessary for the control unit 120 to perform complicated processing.

Figure 22A:
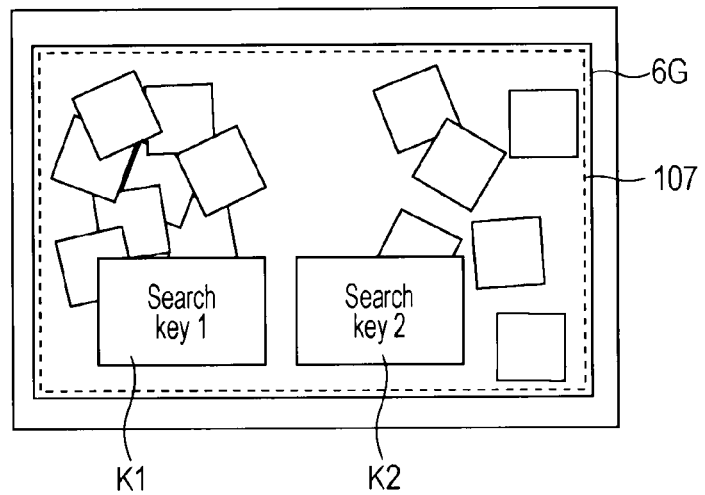
FIGS. 22A and 22B illustrate another example of how to determine the result of the image search according to the fourth modification.
Figure 22B:
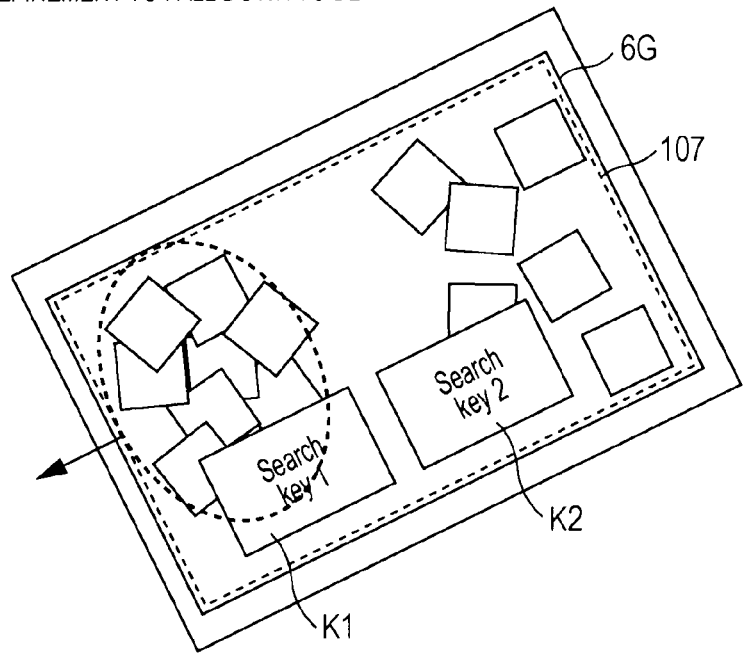

FIGS. 22A and 22B illustrate a third example of the determination operation of the result of the image search, which can be performed by the user at arbitrary timing. FIG. 22A illustrates a state in which the display of the result of the image search using the search key k1 corresponding to the search key display K1 is kept.

When the image pickup apparatus 100 is tilted in a manner illustrated in FIG. 22B in the state in FIG. 22A, the images that are collectively displayed as the result of the image search are determined to be the result of the image search.

In this case, displaying the images as if the images were falling down from the display screen 6G allows the result of the image search to be determined while presenting to the user an image in which the images are moved to another container.

In the example in FIGS. 22A and 22B, the user only can tilt the image pickup apparatus 100 to determine the result of the image search.

In this case, the control unit 120 can determine whether the image pickup apparatus 100 is tilted on the basis of the detection result output from the motion sensor 137. If the image pickup apparatus 100 is tilted while the result of the image search is being displayed, the control unit 120 recognizes that the operation by the user is to determine the result of the image search and it is not necessary for the control unit 120 to perform complicated processing.

Figure 23A:
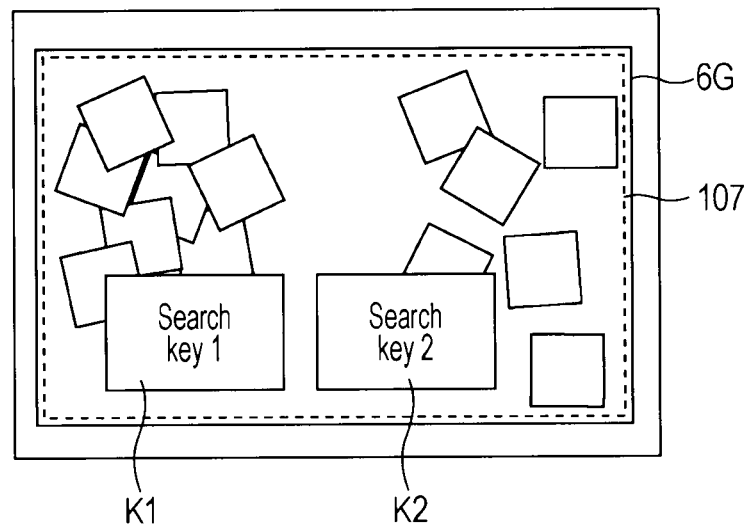
FIGS. 23A and 23B illustrate another example of how to determine the result of the image search according to the fourth modification.
Figure 23B:
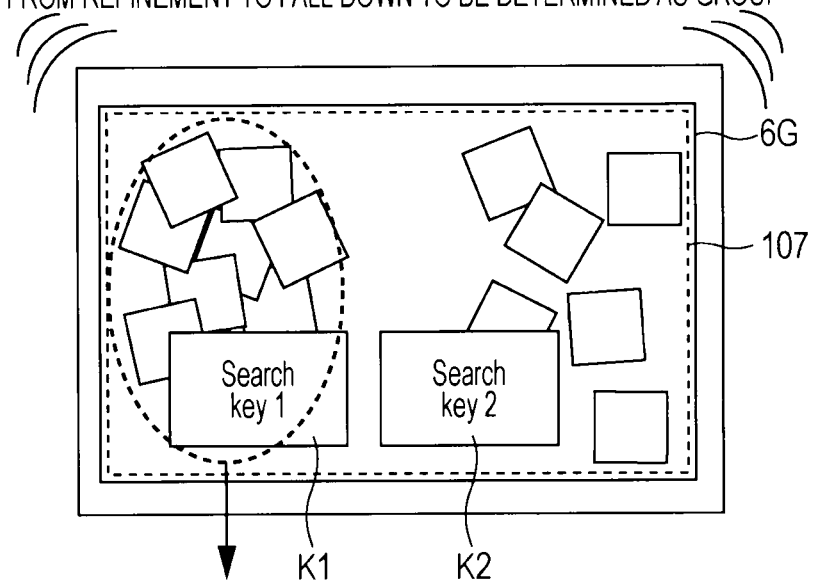

FIGS. 23A and 23B illustrate a fourth example of the determination operation of the result of the image search, which can be performed by the user at arbitrary timing. FIG. 23A illustrates a state in which the display of the result of the image search using the search key k1 corresponding to the search key display K1 is kept.

When the image pickup apparatus 100 is shook from side to side in a manner illustrated in FIG. 23B in the state in FIG. 23A, the images that are collectively displayed as the result of the image search are determined to be the result of the image search.

In this case, displaying the images as if the images were falling down from the display screen 6G allows the result of the image search to be determined while presenting to the user an image in which the images are moved to another container.

In the example in FIGS. 23A and 23B, the user only can shake the image pickup apparatus 100 from side to side to determine the result of the image search.

In this case, the control unit 120 can determine whether the image pickup apparatus 100 is shook from side to side on the basis of the detection result output from the motion sensor 137. If the image pickup apparatus 100 is shook from side to side while the result of the image search is being displayed, the control unit 120 recognizes that the operation by the user is to determine the result of the image search and it is not necessary for the control unit 120 to perform complicated processing.

Figure 24A:
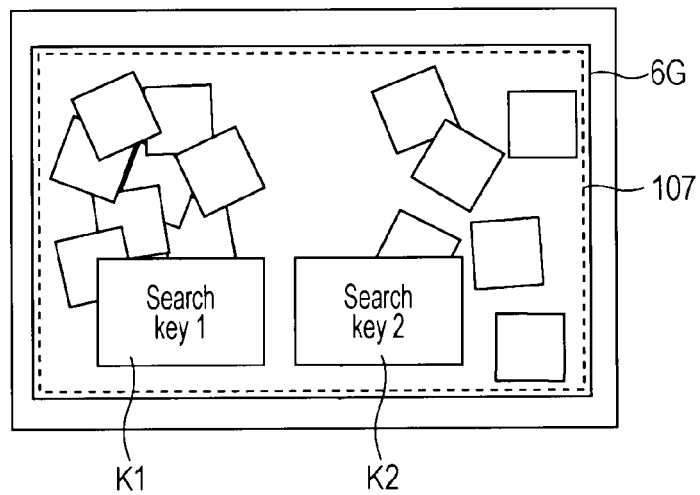
FIGS. 24A and 24B illustrate another example of how to determine the result of the image search according to the fourth modification.
Figure 24B:
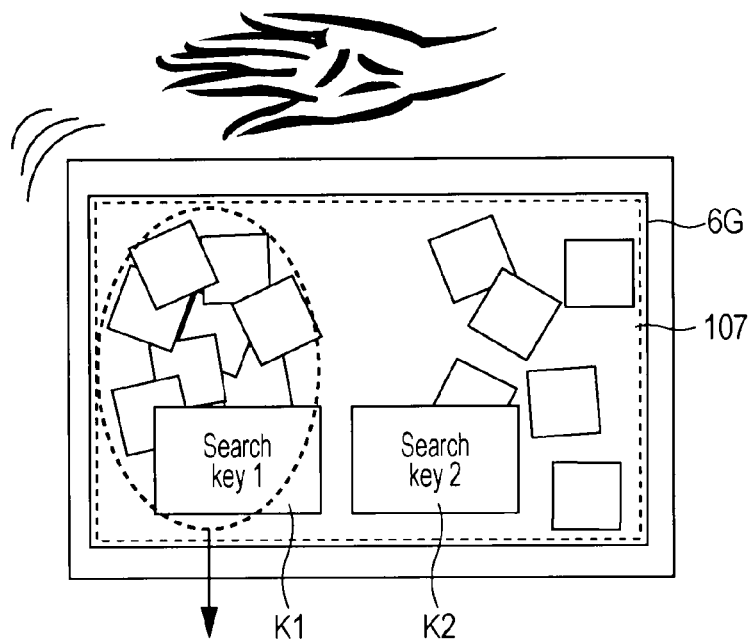

FIGS. 24A and 24B illustrate a fifth example of the determination operation of the result of the image search, which can be performed by the user at arbitrary timing. FIG. 24A illustrates a state in which the display of the result of the image search using the search key k1 corresponding to the search key display K1 is kept.

When the top face of the image pickup apparatus 100 is tapped by the user in a manner illustrated in FIG. 24B in the state in FIG. 24A, the images that are collectively displayed as the result of the image search are determined to be the result of the image search.

In this case, displaying the images as if the images were falling down from the display screen 6G allows the result of the image search to be determined while presenting to the user an image in which the images are moved to another container.

In the example in FIGS. 24A and 24B, the user only can tap the top face of the image pickup apparatus 100 to determine the result of the image search.

In this case, the control unit 120 can determine whether the image pickup apparatus 100 is tapped on the basis of the detection result output from the motion sensor 137 or the detection result output from the touch panel 136 on the apparatus.

If the image pickup apparatus 100 is tapped while the result of the image search is being displayed, the control unit 120 recognizes that the operation by the user is to determine the result of the image search and it is not necessary for the control unit 120 to perform complicated processing.

[Fifth Modification]

Although a keyword or an image itself is used as the search key in the above embodiments and modifications, the search key is not restricted to the above ones. As described above, the GPS information is added to the image file. Accordingly, position information including longitude information and latitude information, which is represented in a manner similar to that of the GPS information, may be used as the search key.

When the position information is used as the search key, desired position information may be selected from the GPS information that has been already added to the image file or the user may input the position information used as the search key with the operation unit 131.

Alternatively, a position information table in which place names are associated with position information may be created in the EEPROM 124 or the recording medium 135 in the image pickup apparatus 100. In this case, the position information may be acquired from a place name that is input to use the acquired position information as the search key.

Also when the position information is used as the search key, the image search is performed if the user performs an instruction operation (touch operation) on the search key display that is made in accordance with the position information, as described above.

The image search not only results in extraction of image files having the GPS information matched with the position information, which is the instructed search key, but also can result in extraction of image files having the GPS information within a certain range. For example, image files having the GPS information within a range of a radius of 5 km around the position information, which is used as the search key, can be extracted.

As described above, the image search using the information added to each image file as the metadata can be performed.

[Advantages of Embodiments]

In the image pickup apparatus 100 of the above embodiments, the image search can be performed by utilizing the feature of the touch panel 107 while the state of the image search refinement is being confirmed.

If the result of the image search is different from a desired state, it is possible to immediately detect that state and to easily switch to another search key (search condition).

If the image search results in a desired state, one image can be determined from the images resulting from the search refinement by an intuitive operation. This is close to a state in which objects are organized in real world, thus improving the usability of the image pickup apparatus.

[Method and Program]

As apparent from the above embodiments, the method and program according to the embodiments of the present invention can be mainly realized as the method and program described above with reference to the flowcharts in FIGS. 11 and 12.

Specifically, the present invention is applicable to the method described above with reference to FIGS. 11 and 12.

The present invention is applicable to a program executing the process described above with reference to FIGS. 11 and 12.

Accordingly, the image processing apparatus according to the embodiments of the present invention can be realized by installing the program according to the embodiment of the present invention in a digital still camera or various image processing apparatuses.

[Others]

In the above embodiments, the display unit 106 realizes a display device, the touch panel 107 realizes instructed-position detecting means, and the recording medium 135 realizes storing means. Primarily, the control unit 120 realizes search-key display controlling means, searching means, and display controlling means.

Although the present invention is applied to the image pickup apparatus in the above embodiments, the present invention is not restricted to the image pickup apparatus. For example, the present invention is applicable to a mobile phone terminal with a camera function, a mobile information terminal called a personal digital assistant (PDA) capable of image data processing, and various other image processing apparatuses capable of image data processing.

The image data to be displayed is not restricted to image data about still images. For example, the present invention is applicable to an image processing apparatus that displays representative images and thumbnail images of multiple motion picture contents stored in a recording medium.

Although the touch panel 107 in the image pickup apparatus 100 is capable of detecting contact with a finger of a user or the like in the above embodiments, the function of the touch panel 107 is not restricted to the above one. For example, a touch panel capable of detecting the position of a finger of a user or the like that is not in contact with its operation panel but is made close to its operation panel to some extent can be used to realize the image pickup apparatus 100 according to the embodiment of the present invention.

In other words, the touch panel 107 is not restricted to the contact type touch panel. For example, a non-contact type touch panel may be used, which can detect a variation in voltage or brightness on its operation panel at a position to which a finger of the user or the like comes close to some extent to identify the position on the operation panel as an instructed position.

Although the thumbnail images are displayed at random positions and in random orientations, for example, as illustrated in FIG. 8A, in the above embodiments, the display of the thumbnail images is not restricted to the above one.

The thumbnail images may be displayed in a constant orientation. To sum up, the embodiments of the present invention feature in the collective display of the thumbnail images of the images matched with the search key in a certain part on the display screen as the result of the image search. Other parts may be displayed in various manners.

The present application contains subject matter related to that disclosed in Japanese Priority Patent Application JP 2008-303681 filed in the Japan Patent Office on Nov. 28, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   circuitry configured to receive an instruction operation by a user on a display screen of a display device, to detect a position where the instruction operation is performed, and to output the detected position; and
   a memory configured to store a plurality of image data items each including information corresponding to a respective search key,
   wherein the circuitry is further configured to:
      cause a plurality of the search keys to be selectively displayed on the display screen of the display device based on selection by a user of said plurality of search keys;
      perform a first search, responsive to the user selection and selective display of the search keys on the display screen of the display device, of the memory for image data corresponding to the selected search keys to extract corresponding image data;
      responsive to the first search, display at the same time said selected plurality of search keys and images corresponding to the extracted corresponding image data in a first arrangement in a part of the display screen;
      perform a second search, while displaying at the same time said selected plurality of search keys and said images corresponding to the extracted corresponding image data, responsive to selection by the user of one of said selected plurality of search keys selectively displayed on the display screen; and
      collectively display at the same time, responsive to the selection by the user of said one of said selected plurality of search keys, said selected plurality of search keys, a first set of one or more images of the displayed images associated with the first search which correspond to the extracted image data in a second arrangement different from the first arrangement in a first certain part on the display screen, and a second set of one or more images of the displayed images associated with the first search which correspond to the extracted image data in a third arrangement separate from the second arrangement on a second certain part of the display screen, and
wherein a portion of the first certain part of the display screen is included in the part of the display screen associated with the first display arrangement of said selected plurality of search keys and the images.

2. The image processing apparatus according to claim 1, wherein the circuitry is further configured to:
receive the instruction operation by the user on an operation panel corresponding to the display screen of the display device,
detect the position where the instruction operation is performed on the operation panel, and
output the detected position.

3. The image processing apparatus according to claim 2, wherein the circuitry is further configured to:
determine, when an instruction operation to determine a result associated with the second search is received within a predetermined time since said selected plurality of search keys and the images corresponding to the extracted image data have been collectively displayed at the same time, the result associated with the second search which is being displayed in the second arrangement.

4. The image processing apparatus according to claim 3, wherein the instruction operation to determine the result associated with the second search is a dragging operation to surround the first set of one or more images collectively displayed in the second arrangement in the first certain part on the display screen of the display device on the operation panel.

5. The image processing apparatus according to claim 3, wherein the instruction operation to determine the result associated with the second search is an instruction operation to keep contact with a predetermined position on the operation panel for a predetermined time period or longer.

6. The image processing apparatus according to claim 3, wherein the instruction operation to determine the result associated with the second search is an operation to instruct a predetermined position on the operation panel twice.

7. The image processing apparatus according to claim 3, wherein the instruction operation to determine the result associated with the second search is an operation to store the first set of one or more images collectively displayed in the second arrangement in the first certain part on the display screen of the display device in a desired folder.

8. The image processing apparatus according to claim 3, wherein the circuitry is further configured to:
detect a motion of the image processing apparatus, and
wherein the instruction operation to determine the result associated with the second search is a detected operation to tilt the image processing apparatus.

9. The image processing apparatus according to claim 3, wherein the circuitry is further configured to:
detect a motion of the image processing apparatus, and
wherein the instruction operation to determine the result associated with the second search is a detected operation to shake the image processing apparatus.

10. The image processing apparatus according to claim 3, wherein the circuitry is further configured to:
detect an operation associated with a tap to the image processing apparatus, and
wherein the instruction operation to determine the result associated with the second search is the operation associated with the tap to the image processing apparatus.

11. The image processing apparatus according to claim 2, wherein the circuitry is further configured to:
clear, when no instruction operation is received within a predetermined time since said selected plurality of search keys and the images corresponding to the extracted image data have been collectively displayed at the same time, the result associated with the second search and return the display to an original state.

12. The image processing apparatus according to claim 2, wherein the instruction operation is performed regarding a plurality of positions on the operation panel.

13. The image processing apparatus according to claim 2, wherein each of the search keys includes at least one of text data, position information, and image data.

14. The image processing apparatus according to claim 13, wherein, when the image data is used as one of the search keys, one or more parts of the image corresponding to the image data are instructed as the search keys based on the instruction operation on the operation panel.

15. The image processing apparatus according to claim 2, wherein the circuitry is further configured to:
move the position of where one of the search keys is displayed in accordance with a continuously moved instruction position; and
move one of the images corresponding to the extracted image data based on the movement of the position where said one search key is displayed.

16. The image processing apparatus according to claim 2, wherein the circuitry is further configured to:
move the position of where one of the search keys is displayed in accordance with a continuously moved instruction position; and
move, when one of the images corresponding to image data that is not matched with the selected keys is displayed, said one image to a position away from the position where said one search key associated with the second search is displayed in accordance with the continuous movement of the position where said one search key is displayed.

17. an image displaying method comprising:
causing a plurality of search keys to be selectively displayed on a display screen of a display device by search-key display controlling circuitry based on selection of the plurality of search keys by a user;
receiving an instruction operation by the user through instructed-position detecting circuitry that receives an instruction operation by the user on the display screen of the display device, detecting a position where the instruction operation is performed, and outputting the detected position;
performing a first search responsive to user selection and display of the search keys based on said receiving the instruction operation, of a memory in which a plurality of image data items each including information corresponding to a respective search key are stored for the image data corresponding to the selected search keys, to extract corresponding image data using searching circuitry;
responsive to said first search, displaying at the same time the selected search keys and images corresponding to the extracted image data in a first arrangement in a part of the display screen;
performing a second search, while displaying at the same time said selected plurality of search keys and said images corresponding to the extracted corresponding image data, responsive to selection by the user of one of said selected plurality of search keys displayed on the display screen; and collectively displaying at the same time, responsive to the selection by the user of said one of said selected plurality of search keys, said selected search keys, a first set of one or more images of the displayed images associated with the first search which correspond to the image data extracted in the second search in a second arrangement different from the first arrangement in a first certain part on the display screen, and a second set of one or more images of the displayed images associated with the first search which correspond to the extracted image data in a third arrangement separate from the second arrangement on a second certain part of the display screen, using display controlling circuitry, wherein a portion of the first certain part of the display screen is included in the part of the display screen associated with the first display arrangement of the selected search keys and the images.

18. a non-transitory computer-readable storage medium storing computer-readable instructions that, when executed by a computer, cause the computer to perform a method comprising:

causing a plurality of search keys to be selectively displayed on a display screen of a display device by search-key display controlling circuitry based on selection of the plurality of search keys by a user;

receiving an instruction operation by the user through instructed-position detecting circuitry that receives an instruction operation by the user on the display screen of the display device, detecting a position where the instruction operation is performed, and outputting the detected position;

performing a first search responsive to user selection and display of the search keys based on said receiving the instruction operation, of a memory in which a plurality of image data items each including information corresponding to a respective search key are stored for the image data corresponding to the selected search keys, to extract corresponding image data; responsive to said first search, displaying at the same time the selected search keys and images corresponding to the extracted image data in a first arrangement in a part of the display screen;

performing a second search, while displaying at the same time said selected plurality of search keys and said images corresponding to the extracted corresponding image data, responsive to selection by the user of one of said selected plurality of search keys displayed on the display screen; and collectively displaying at the same time, responsive to the selection by the user of said one of said selected plurality of search keys, said selected search keys, and a first set of one or more images of the displayed images associated with the first search which correspond to the image data extracted in the second search in a second arrangement different from the first arrangement in a first certain part on the display screen, and a second set of one or more images of the displayed images associated with the first search which correspond to the extracted image data in a third arrangement separate from the second arrangement on a second certain part of the display screen, by display controlling circuitry, wherein a portion of the first certain part of the display screen is included in the part of the display screen associated with the first display arrangement of the selected search keys and the images.

19. An image processing system comprising:

circuitry configured to receive an instruction operation by a user on a display screen of a display device, to detect a position where the instruction operation is performed, and to output the detected position;

a memory configured to store a plurality of image data items each including information corresponding to a respective search key, wherein the circuitry is further configured to:

cause a plurality of the search keys to be selectively displayed on the display screen of the display device based on selection by a user of said plurality of search keys;

perform a first search responsive to the user selection and selective display of the search keys on the display screen of the display device, of the memory for image data corresponding to the selected search keys to extract corresponding image data;

responsive to the first search, display images corresponding to the image data extracted by the searching circuitry in a first arrangement in a part of the display screen;

perform a second search, while displaying at the same time said selected plurality of search keys and said images corresponding to the extracted corresponding image data, responsive to selection by the user of two of said selected plurality of search keys selectively displayed on the display screen; and collectively display, responsive to the selection by the user of said two search keys, a first set of one or more images of the displayed images associated with the first search which correspond to the extracted image data in a second arrangement different from the first arrangement in a first certain part on the display screen, and a second set of one or more images of the displayed images associated with the first search which correspond to the extracted image data in a third arrangement separate from the second arrangement on a second certain part of the display screen, wherein a portion of the first certain part of the display screen is included in the part of the display screen associated with the first display arrangement of the images.

20. The image processing apparatus according to claim 1, wherein search key candidates for display and user selection are categorized and stored in a table in the memory, wherein one or more of the search key candidates are selectable by the user per category, and one or more categories of the search key candidates are selectable by the user, wherein the first search results in display of thumbnail images corresponding to the selected search keys on the display screen in a random order, and wherein the first search is performed with respect to a user-defined search range.

* * * * *